United States Patent
Okawa et al.

(10) Patent No.: US 9,794,470 B2
(45) Date of Patent: Oct. 17, 2017

(54) PHOTOGRAPHING APPARATUS AND INTERCHANGEABLE LENS CONTROL METHOD

(71) Applicant: Olympus Corporation, Shibuya-ku, Tokyo (JP)

(72) Inventors: Satoshi Okawa, Hachioji (JP); Kento Hara, Kokubunji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/985,637

(22) Filed: Dec. 31, 2015

(65) Prior Publication Data
US 2016/0119533 A1    Apr. 28, 2016

Related U.S. Application Data

(63) Continuation of application No. PCT/JP2014/067009, filed on Jun. 26, 2014.

(30) Foreign Application Priority Data

Jul. 2, 2013   (JP) ................................. P2013-138926

(51) Int. Cl.
*H04N 5/232*     (2006.01)
*G03B 3/00*      (2006.01)
(Continued)

(52) U.S. Cl.
CPC ........... *H04N 5/23212* (2013.01); *G03B 3/00* (2013.01); *G03B 5/00* (2013.01); *G03B 17/02* (2013.01);
(Continued)

(58) Field of Classification Search
CPC ........... H04N 5/23212; H04N 5/23296; H04N 5/2254; H04N 5/23209; G03B 3/00; G03B 17/02; G03B 17/14; G03B 5/00
(Continued)

(56) References Cited

U.S. PATENT DOCUMENTS 5,898,528 A * 4/1999 Fukino ..................... G02B 7/10
                                                    359/696
8,649,675 B2 * 2/2014 Takahata ................ G03B 17/14
                                                    348/240.3
(Continued)

FOREIGN PATENT DOCUMENTS

JP     2006-058367     3/2006
JP     2008-015273     1/2008
(Continued)

OTHER PUBLICATIONS

International Search Report to International Application No. PCT/JP2014/067009, mailed on Oct. 7, 2014 (1 pg.) with translation (1 pg.).

(Continued)

*Primary Examiner* — Pritham Prabhakher
(74) *Attorney, Agent, or Firm* — John C. Pokotylo; Pokotylo Patent Svcs.

(57) ABSTRACT

A photographing apparatus comprising: a focus adjustment lens which is provided within a lens barrel containing a photographing lens and is movable in an optical axis direction; a ring member disposed rotatably with respect to the lens barrel in an angle range from a first end point to a second end point; a storage unit to store a first relationship between a rotation angle of the ring member and a distance, and a second relationship between a position of the focus adjustment lens in the optical axis direction and the distance; and a control unit to calculate a distance corresponding to a rotation angle of the ring member according to a rotation angle of the ring member and the first relationship, and to set a position of the focus adjustment lens in the optical axis direction according to the distance and the second relationship.

24 Claims, 16 Drawing Sheets

(51) Int. Cl.
  *G03B 5/00* (2006.01)
  *G03B 17/02* (2006.01)
  *H04N 5/225* (2006.01)
  *G03B 17/14* (2006.01)
(52) U.S. Cl.
  CPC ....... *H04N 5/2254* (2013.01); *H04N 5/23209* (2013.01); *H04N 5/23296* (2013.01); *G03B 17/14* (2013.01)
(58) Field of Classification Search
  USPC ........................................................ 348/335
  See application file for complete search history.

(56) References Cited

U.S. PATENT DOCUMENTS

| | | | | |
|---|---|---|---|---|
| 8,660,419 | B2* | 2/2014 | Toyama | G02B 7/08 |
| | | | | 396/131 |
| 8,938,162 | B2* | 1/2015 | Yamanaka | G03B 13/34 |
| | | | | 396/133 |
| 9,013,607 | B2* | 4/2015 | Taguchi | H04N 5/232 |
| | | | | 348/240.2 |
| 9,544,483 | B2* | 1/2017 | Nakata | H04N 5/23209 |
| 2007/0147818 | A1* | 6/2007 | Mori | G02B 7/102 |
| | | | | 396/144 |
| 2009/0109316 | A1* | 4/2009 | Matsui | H04N 5/23293 |
| | | | | 348/333.01 |
| 2010/0060777 | A1 | 3/2010 | Yumiki | |
| 2010/0238321 | A1* | 9/2010 | Honjo | G02B 7/102 |
| | | | | 348/231.99 |
| 2011/0158622 | A1* | 6/2011 | Saito | G03B 3/10 |
| | | | | 396/79 |
| 2012/0327274 | A1 | 12/2012 | Taguchi | |
| 2012/0328276 | A1 | 12/2012 | Toyama | |
| 2012/0328277 | A1 | 12/2012 | Nakata | |
| 2013/0051780 | A1* | 2/2013 | Takahata | G03B 17/14 |
| | | | | 396/85 |

FOREIGN PATENT DOCUMENTS

| | | |
|---|---|---|
| JP | 2009-151081 | 7/2009 |
| JP | 2013-011918 | 1/2013 |

OTHER PUBLICATIONS

Extended European Search Report to corresponding European Application No. 14819867.4, mailed on Nov. 9, 2016 (7 pgs.).
Office Action to corresponding Japanese Application No. 2013-138926, mailed on Mar. 2, 2017 (4 pgs.).

* cited by examiner

PHOTOGRAPHING APPARATUS AND INTERCHANGEABLE LENS CONTROL METHOD

CROSS-REFERENCE TO RELATED APPLICATIONS

This application is a Continuation Application of PCT Application No. PCT/JP2014/067009, filed on Jun. 26, 2014 and based upon and claiming the benefit of priority from prior Japanese Patent Application No. 2013-138926, filed on Jul. 2, 2013, the entire contents of all of which are incorporated herein by reference.

BACKGROUND OF THE INVENTION

1. Field of the Invention

The present invention relates to a photographing apparatus and an interchangeable lens control method, and, in detail, relates to a photographing apparatus which includes a ring member disposed rotatably on a zoom lens barrel and can perform focusing so as to obtain focusing at a distance set by the rotation of the ring member, and an interchangeable lens control method.

2. Description of the Related Art

There has been proposed a photographing apparatus in which a focus ring is provided on a lens barrel and a user operates to rotate this focus ring, thereby enabling manual focusing (e.g., Japanese Patent Laid-Open No. 2006-58367 (herein after referred to as "Patent Literature 1"). In a photographing apparatus disclosed in Patent Literature 1, when the focus ring is operated to rotate, a display ring is rotated following this operation to indicate a subject distance.

In the photographing apparatus disclosed in the above Patent Literature 1, it is possible to confirm a focused subject distance (absolute distance). However, it is not possible to perform focusing at a subject distance intended by a photographer. That is, it is not possible to perform the focusing at an intended photographing distance by operating the focus ring provided with an absolute distance.

SUMMARY OF THE INVENTION

The present invention provides a photographing apparatus and an interchangeable lens control method capable of performing focusing at a distance designated by an operation member in manual focusing.

A photographing apparatus according to a first aspect of the present invention includes a focus adjustment lens which is provided within a lens barrel containing a photographing lens and is movable in an optical axis direction; a ring member disposed rotatably with respect to the lens barrel in an angle range from a first end point to a second end point; a storage unit to store a first relationship between a rotation angle of the ring member and a value related to a subject distance, and a second relationship between a position of the focus adjustment lens in the optical axis direction and a value related to a subject distance to be focused corresponding to the position of the focus adjustment lens in the optical axis direction; a rotation angle detection unit to detect a rotation angle of the ring member; and a control unit to calculate a value related to a subject distance corresponding to the rotation angle of the ring member according to the rotation angle of the ring member which is detected by the rotation angle detection unit and the first relationship, and to set a position of the focus adjustment lens in the optical axis direction according to the value related to the subject distance and the second relationship.

An interchangeable lens control method according to a second aspect of the present invention is an interchangeable lens control method of an interchangeable lens including a focus adjustment lens which is provided within a lens barrel containing a photographing lens and is movable in an optical axis direction, a ring member disposed rotatably on the lens barrel in an angle range from a first end point to a second end point, and a rotation angle detection unit to detect a rotation angle of the ring member, the interchangeable lens control method comprising: calculating a value related to a subject distance corresponding to a rotation angle of the ring member according to a first relationship between a rotation angle of the ring member and a value related to a subject distance; and setting a position of the focus adjustment lens in the optical axis direction according to the second relationship between a position of the focus adjustment lens in the optical axis direction and a value related to a subject distance to be focused corresponding to the focus adjustment lens in the optical axis direction.

DETAILED DESCRIPTION OF THE PREFERRED EMBODIMENTS

Figure 1:
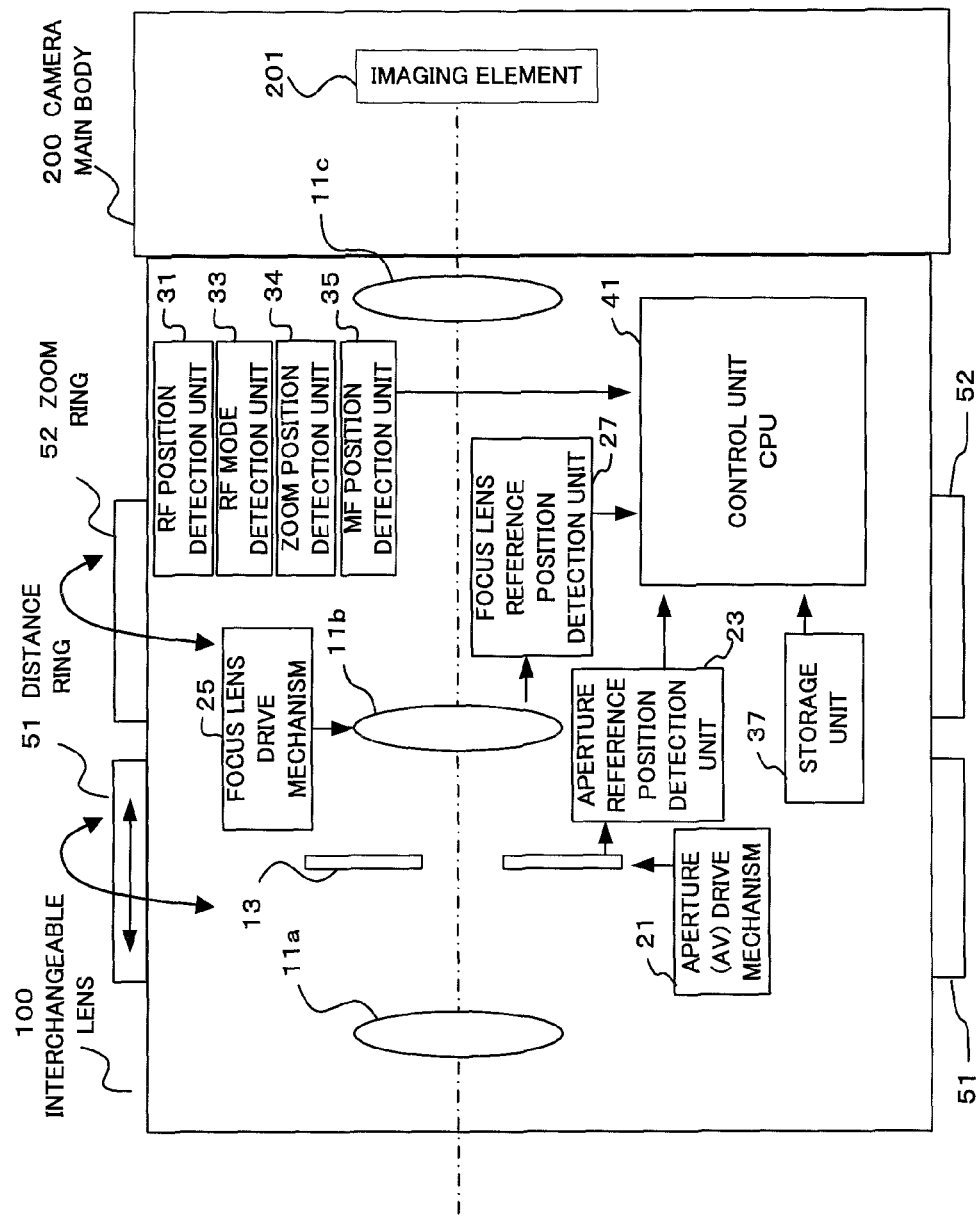
FIG. 1 is a block diagram showing a configuration of a camera according to an embodiment of the present invention.
Figure 2:
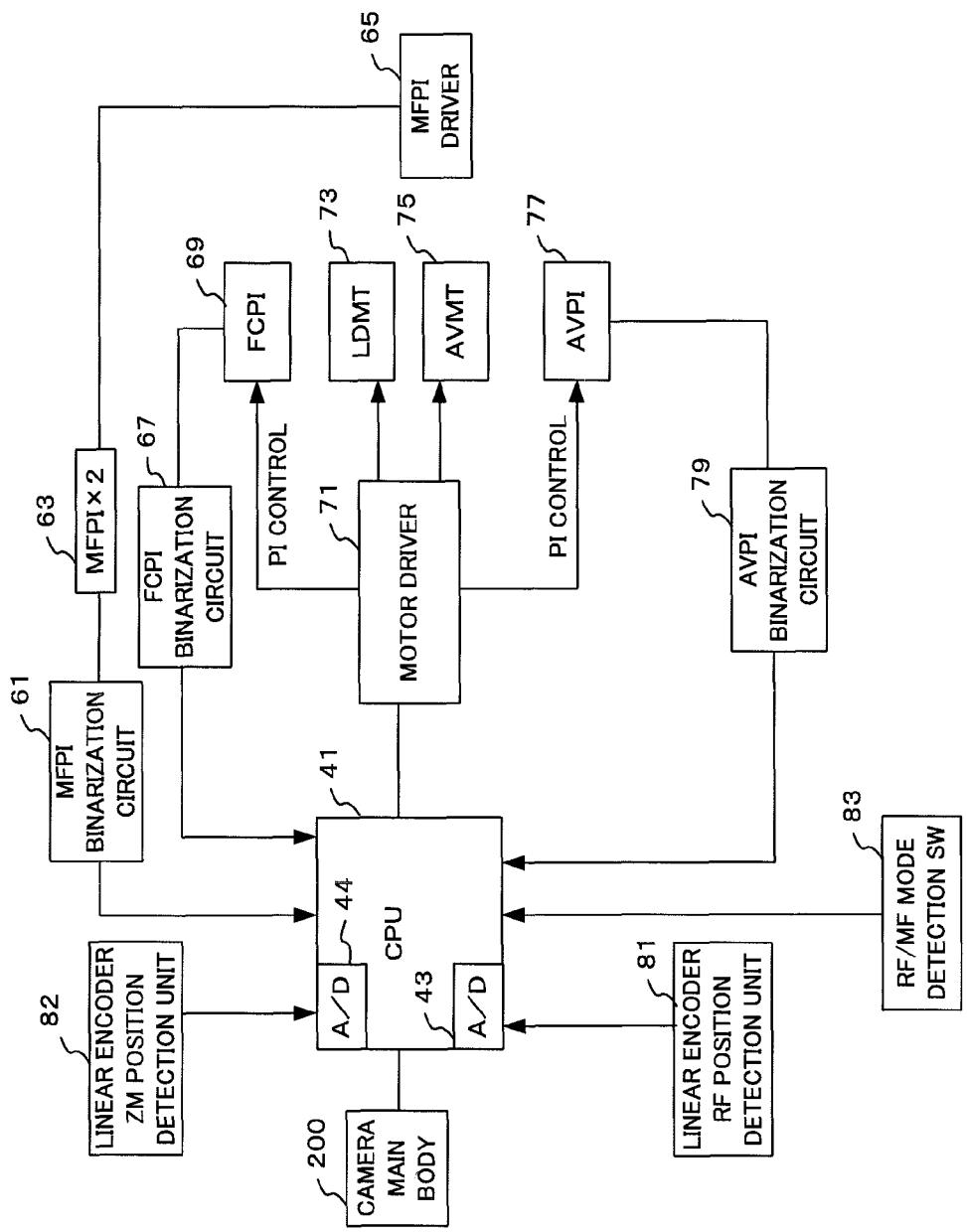
FIG. 2 is a block diagram mainly showing an electrical configuration of a camera according to an embodiment of the present invention.

Hereinafter, a preferable embodiment using a camera to which the present invention is applied will be explained according to the drawings. FIG. 1 is a block diagram showing a configuration of a camera according to an embodiment of the present invention, and FIG. 2 is a block diagram showing an electrical configuration of this camera. This camera is configured with an interchangeable lens 100 and a camera main body 200. However, obviously a lens barrel and the camera main body may be configured in a unit.

The interchangeable lens 100 contains a photographing lens 11 configured with lenses 11a to 11c thereinside. The photographing lens 11 forms a subject image. Among the lenses, focus lens 11b is a lens for focus adjustment, and can be moved in the optical axis direction by a focus lens drive mechanism 25. The focus lens drive mechanism 25 includes a focus lens actuator and a focus lens drive circuit. Accordingly, the focus lens 11b performs a function as a focus adjustment lens which is provided in a lens barrel containing the photographing lens and is movable in the optical axis direction. Further, a part of the lenses 11a to 11c is a zoom lens for changing a focal length. Accordingly, a zoom lens group is provided inside the interchangeable lens 100.

Further, a focus lens reference position detection unit 27 outputs a detection signal to a CPU 41 which is a control unit, when the focus lens 11b reaches a reference position. A photo-interrupter (PI) is used for the reference position detection. Here, in the present embodiment, the position detection of the focus lens 11b is performed after the reference position is detected, according to the number of pulses applied to the focus lens actuator (a pulse motor is used) using the position as a reference.

An aperture 13 is disposed between the lenses 11a and 11b. The opening diameter of the aperture 13 is changed by an aperture drive mechanism 21 to change a subject light amount passing through the photographing lens 11. The aperture drive mechanism 21 includes an aperture actuator, an aperture drive circuit, and the like. A stepping motor is used as the actuator, and fine control is performed by micro-step drive. Note that obviously the aperture 13 may be disposed at a position except the position between the lenses 11a and 11b.

An aperture reference position detection unit 23 outputs a detection signal to the CPU 41 when the opening diameter of the aperture reaches a reference position. For the aperture position, a reference position is obtained by the reference position detection unit 23, and the aperture position is managed by relative position detection. The relative position detection is performed according to the number of pulses applied to the stepping motor, and the reference position detection is performed by a photo-interrupter (PI).

Figure 3A:
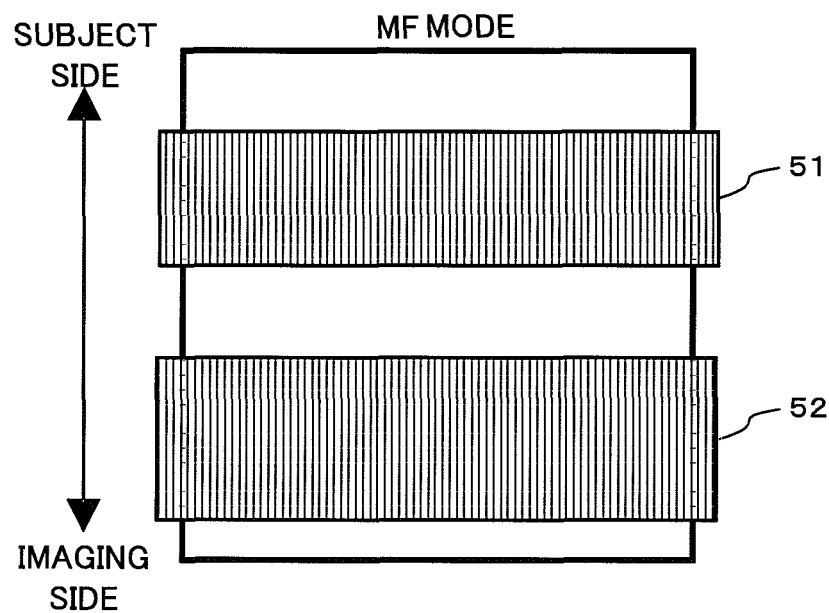
FIG. 3A and FIG. 3B are a diagram explaining the setting of an RF mode and a non-RF mode of a camera according to an embodiment of the present invention, and is a plan view of a lens barrel.
Figure 3B:
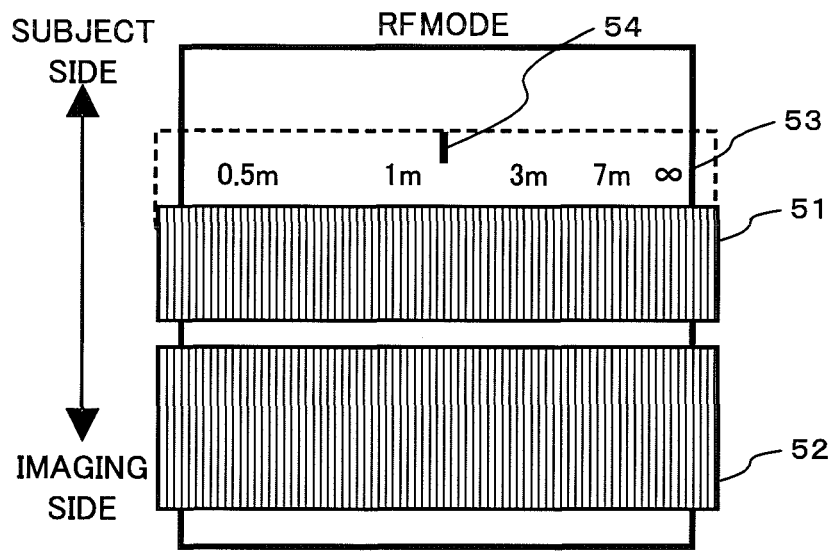

A distance ring 51 is disposed on the outer circumference of the interchangeable lens 100. The distance ring 51 is rotatable along the outer circumference of the interchangeable lens 100, and also slidable in a predetermined range in the optical axis direction of the photographing lens 11. As shown in FIG. 3A and FIG. 3B, this distance ring 51 is set to a non-RF (non-range focus) (sometimes called MF (manual focus)) position, when slid to the subject side, and is set to RF (range focus) position when slid to the main body side. By the slide of the distance ring 51, an RF mode and a non-RF mode (MF mode) are switched. The detection of these modes is performed by an RF mode detection unit 33. Further, the distance ring 51 is configured to be rotatable between a near end and infinity. Accordingly, the distance ring 51 performs a function as a ring member disposed rotatably with respect to the lens barrel in an angle range from a first end point to a second end point.

The non-RF mode is a mode for a user to perform focusing according to a rotation direction and a rotation amount of the distance ring 51, while the RF mode is a mode to perform focusing at a distance designated by the distance ring 51. That is, while both of the non-RF mode and the MF mode are manual focus modes, they are different in that the distance ring 51 designates a relative distance in the non-RF mode, and differently the distance ring 51 designates an absolute distance in the RF mode.

When the MF mode is set by the slide of the distance ring 51, a light blocking blade inside the distance ring 51 integrally rotates together with the rotating distance ring 51. The rotation of this light blocking blade is counted by a photo-interrupter (PI), and the focus lens 11b is driven according to this count value. Note that obviously the rotation direction and the rotation amount of the distance ring 51 may be detected by a sensor except the photo-interrupter.

When the RF mode is set by the slide of the distance ring 51 and the distance ring 51 is rotated, an RF position detection unit 31 detects the rotation position. The RF position detection unit 31 detects an absolute position for the rotation position of the distance ring 51. The focus lens drive mechanism 25 drives the focus lens 11b to a photographing distance corresponding to the rotation position of the distance ring 51 according to a control signal from the CPU 41.

The RF mode detection unit 33 detects whether the distance ring 51 is set to the non-RF position (MF position) or the RE position, from an output of an RF/MF mode detection switch 83 (refer to FIG. 2).

An MF position detection unit 35 detects the rotation direction and the rotation amount of the distance ring 51 when the distance ring 51 is set to the non-RF position (MF position). The manual focusing is performed according to the detection result of this MF position detection unit 35.

A zoom ring 52 is disposed on the outer circumference of the interchangeable lens 100 on the main body side from the distance ring 51 so as to be rotatable along the outer circumference thereof. The user can perform zooming by rotating the zoom ring 52 manually.

A zoom position detection unit 34 detects the absolute value of the rotation position of the zoom ring 52 and outputs the detection result to the CPU 41. The zoom position detection unit 34 includes a linear encoder ZM position detection unit 82, as described below, and the output of this linear encoder ZM position detection unit 82 is AD-converted by an A/D converter 44 within the CPU 41. This AD conversion value expresses the focal length. The zoom position detection unit 34 performs a function as a zoom position detection unit to detect the zoom position of the zoom lens group.

A storage unit 37 includes a rewritable nonvolatile memory or the like such as a flash memory 37, and stores a program for the CPU 41, various kinds of information such as the optical data of the interchangeable lens, various kinds of adjustment value, various kinds of parameter, and the like. Further, the storage unit 37 performs a function as a storage unit to store a first relationship between the rotation angle of the ring member and a distance (relationship shown in FIG. 4) and a second relationship between the position of the focus adjustment lens in the optical axis direction and the distance (relationship shown in FIG. 5). Here, the first and second relationships are stored as a table, in the present embodiment.

The CPU 41 which is the control unit performs control within the interchangeable lens 100 according to a program stored in the above storage unit 37 in response to a control instruction from the camera main body 200. The CPU 41 inputs the detection signals from the aperture reference position detection unit 23, the focus lens reference position detection unit 27, the RF position detection unit 31, the RF mode detection unit 33, and the MF position detection unit 35, and outputs control signals to the focus lens drive mechanism 25 and the aperture drive mechanism 21.

Further, the CPU 41 performs a function as the control unit to calculate a distance corresponding to the rotation angle of the ring member according to the rotation angle of the ring member and the first relationship, and to set the position of the focus adjustment lens in the optical axis direction according to this distance and the second relationship. This position setting of the focus lens in the optical axis direction will be described by the use of the flowcharts shown in FIG. 10 to FIG. 16.

An imaging element 201 is disposed within the camera main body 200. This imaging element 201 is disposed around an image formation position of the photographing lens 11, and performs photoelectric conversion on the subject image formed by the photographing lens 11 to output image data. Further, a control CPU is provided also within the camera main body 200, and communicates with the CPU 41 within the interchangeable lens 100.

Next, by the use of FIG. 2, details of an electrical configuration will be explained. The CPU 41 can communicate with the camera main body 200 as described above. Further, the CPU 41 is connected to a motor driver 71, and this motor driver 71 performs the drive of an FCPI 69, an LDMT 73, an AVMT 75, and an AVPI 77.

The FCPI 69 is a photo-interrupter for the reference position detection of the focus lens 11b, the output of this FCPI 69 is connected to an FCPI binarization circuit 67. The FCPI 69 and the FCPI binarization circuit 67 correspond to the above focus lens reference position detection unit 27.

The LDMT 73 is an LD motor (lens drive motor), and functions as a focus actuator within the above focus lens drive mechanism 25. As the LD motor, while the present embodiment employs a VCM (Voice Coil Motor), obviously another motor, for example, a typical stepping motor may be used. The AVMT 75 is an aperture motor, and functions as an aperture actuator within the above aperture drive mechanism 21.

The AVPI 77 is a photo-interrupter for the reference position detection of the aperture 13, and the output of this AVPI 77 is connected to an AVPI binarization circuit 79. The AVPI 77 and the AVPI binarization circuit 79 correspond to the above aperture reference position detection unit 23.

An MFPI driver 65 is a driver of an MFPI 63 to detect the rotational movement of the distance ring 51 when the distance ring 51 is slid to the MF position. The MFPI 63 is provided at two positions along the rotational movement direction of the light blocking blade. The output of this MFPI 63 is connected to an MFPI binarization circuit 61, and binarized by the MFPI binarization circuit 61. The MFPI binarization circuit 61, the MFPI 63, and the MFPI driver 65 correspond to the above MF position detection unit 35.

A linear encoder RF position detection unit 81 is a linear encoder to detect the absolute value of the distance ring 51 in the rotation direction when the distance ring 51 is slid to the RF position. The linear encoder RF position detection unit 81 is provided along the rotational movement direction of the distance ring 51, and outputs an analog signal according to the absolute position of the distance ring 51 in the rotational movement direction. An A/D converter 43 is provided within the CPU 41, and converts the analog signal from the linear encoder RF position detection unit 81 into a digital signal. An A/D conversion value by the A/D converter 43 expresses the subject distance (absolute distance) (sometimes called RF linear encoder AD) set by the user.

A linear encoder ZM position detection unit 82 is an encoder to detect the absolute value of the zoom ring 52 in the rotation direction. The linear encoder ZM position detection unit 82 is provided along the rotational movement direction of the zoom ring 52, and outputs an analog signal according to the absolute position of the zoom ring 52 in the rotational direction. An A/D converter 44 is provided within the CPU 41, and converts the analog signal from the linear encoder ZM position detection unit 82 into a digital signal. An A/D conversion value by the A/D converter 44 expresses the focal length (absolute distance) set by the user.

An RF/MF mode detection switch (SW) 83 is a switch to detect whether the distance ring 51 is set to the RF mode or the MF mode (non-RF mode). This RF/MF mode detection SW 83 detects the position of the distance ring 51 in the optical axis direction, and is turned on or off when the RF mode or the MF mode is set and outputs this on-off state to the CPU 41.

Next, the switching between the RF mode and the MF mode will be explained by the use of FIG. 3A and FIG. 3B. As described above, the distance ring 51 can be slid along the optical axis direction of the interchangeable lens 100, and, when the distance ring 51 is slid to the subject side, the non-RF mode (MF mode) is switched on as shown in FIG. 3A. This MF mode is the same conventional manual focus mode as the conventional one, and the focus lens 11b moves in the optical axis direction according to the rotation direction and the rotation amount of the distance ring 51.

Further, when the distance ring 51 is slid to the main body side (imaging side), the RF mode is switched on as shown in FIG. 3B. After the switching to the RF mode, an RF index 53 indicating distance scales (0.5 m, 1 m, 3 m, 7 m, ∞ in the illustrated example) and an RF reference line 54 are exposed. The distance scales indicated in the RF index 53 are provided at intervals proportional to the reciprocal of a distance, and the index interval is made larger on the near end side. Note that, when the distance ring 51 is set to the non-RF mode, the RF index 53 and the RF reference line 54 are covered by the distance ring 51 and cannot be viewed by the user.

Next, lens drive control in the RF mode in the present embodiment will be explained by the use of FIG. 4 to FIG. 7. As described above, when the RF mode is set, the absolute position of the distance ring 51 in the rotation direction is detected, the control of the focus lens 11b is performed according to this absolute position, and focusing is performed at the designated absolute distance. For improving the use feeling of the focusing in the manual focusing, preferably the movement of the focus lens 11b also follows a minute rotation of the distance ring 51.

Accordingly, the present embodiment uses an LSB (Least Significant bit) (least bit in the A/D conversion) in the AD conversion of the output from the linear encoder RF position detection unit 81 for detecting the absolute position of the distance ring 51 in the RF mode setting, as a resolution without change. While obviously the LSB may not be used as the resolution, the use feeling is improved when a value as close as possible to the least bit is used.

When the control is performed in units of the LSB, a stroke range (AD range or AD values on both end sides) is slightly different for each product due to an assembly variation. Accordingly, it is not possible to use a table method which uses a table indicating a relationship between a divided region and a focus lens position LDPls. Further, when the interchangeable lens 100 is a zoom lens, the range of the focus lens position LDPls to be used is different depending on a zoom position, and therefore it is difficult to use a table method. Accordingly, the present embodiment has solved this problem by expressing the relationship between the AD value indicating the absolute position of the distance ring 51 and the reciprocal of the subject distance (1/L) by a linear equation.

Here, the focus lens position LDPls is expressed by the number of pulses stepping-driven by the LDMT 73 which is a lens drive motor (LD motor) within the focus lens drive mechanism 25, from a reference position (reset position of the focus lens reference position detection unit 27 or infinite position set using the reset position as a reference).

Figure 4:
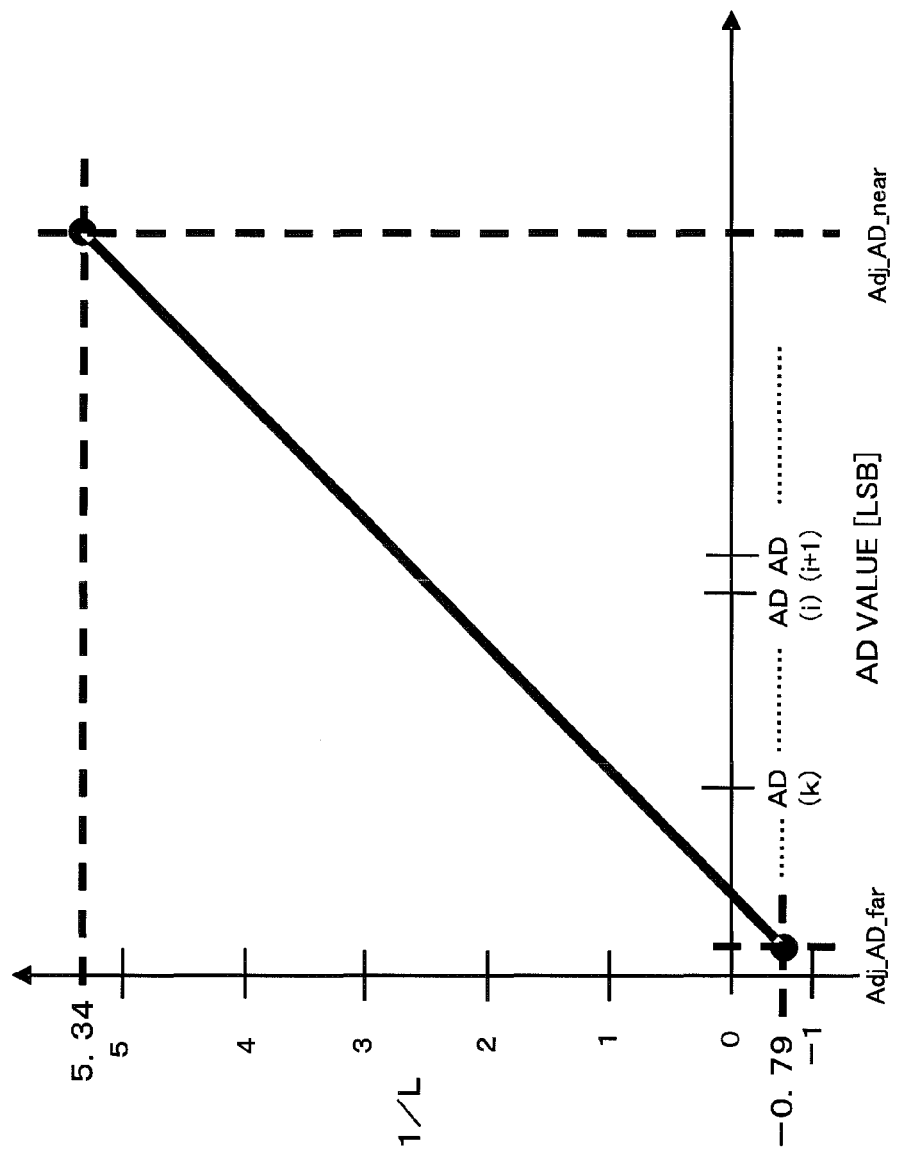
FIG. 4 is a graph showing a relationship between an absolute value (AD value) of an MF ring in the rotation direction in an RF mode and the reciprocal of a subject distance (L), in a camera according to an embodiment of the present invention.

FIG. 4 is a diagram showing a relationship between the AD value indicating the absolute position of the distance ring 51 and the reciprocal of the subject distance (1/L). In FIG. 4, the horizontal axis shows the AD value indicating the absolute position of the distance ring 51, and Adj_AD_near is an AD conversion value corresponding to the output of the linear encoder RF position detection unit 81 when the distance ring 51 is put on the nearest end side of the interchangeable lens and ADj_AD_far is an AD conversion value corresponding to the output of the linear encoder RF position detection unit 81 when the distance ring 51 is put on the infinite side.

Further, in FIG. 4, the vertical axis shows the reciprocal of the subject distance (1/L). In the vertical axis, the maximum value of the reciprocal (1/L) secures a value larger than a design value of a nearest distance. For example, when the nearest distance is 0.2 m, the reciprocal thereof is 5.0, but the example shown in FIG. 4 secures a larger value up to 5.34. The minimum value of the reciprocal (1/L) secures a value smaller than zero which is the reciprocal of an infinity. The example shown in FIG. 4 secures a value down to −0.79.

In this manner, in the present embodiment, the AD value (RF·AD value) and the reciprocal of the distance (1/L) in the RF mode have a relationship as shown in FIG. 4 by linear interpolation, and in summary, have the following relationships (1) to (3).

(1) To always secure optical infinity, a negative value is prepared for 1/L on the infinity side and the optical infinity position can take zero.

(2) Similarly, to secure an optical near end, a value larger than a value corresponding to a nearest photographing distance is prepared for 1/L on the near end side.

(3) The distance display scales are provided in a step of 1/L, and detected by the linear encoder RF position detection unit 81. Accordingly, a relationship of a linear equation Y=aX+b is obtained. Here, Y is the reciprocal of a distance (1/L), and X is an AD value. 1/L is obtained according to the AD conversion value by the use of the above linear equation. The above linear equation is called an AD conversion value −1/L linear interpolation equation.

Figure 5:
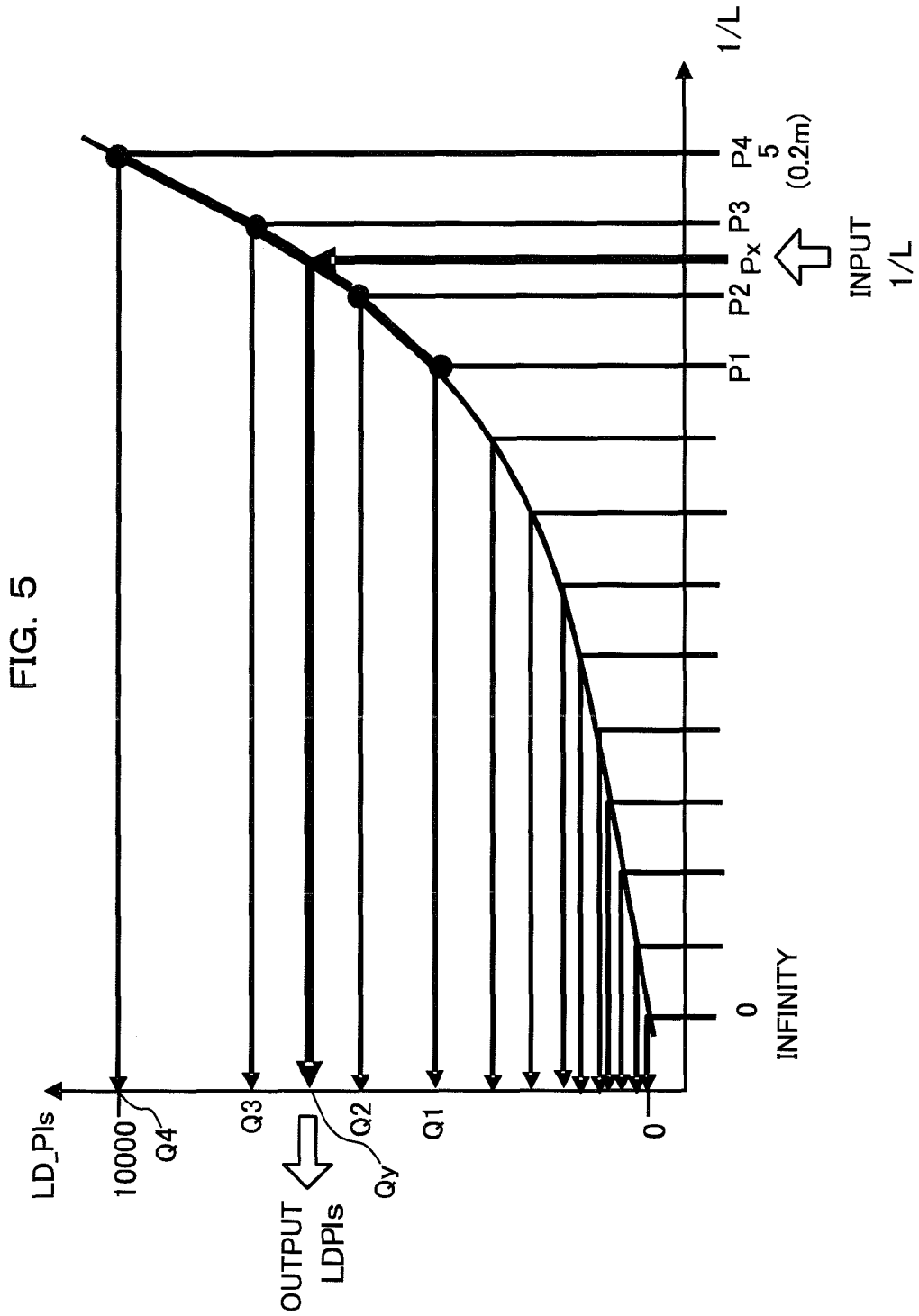
FIG. 5 is a graph showing a relationship between the reciprocal of a subject distance (1/L) and a focus lens position (LDPls), in a camera according to an embodiment of the present invention.

FIG. 5 is a graph showing a relationship between the reciprocal of the distance (1/L) and LDPls. As apparent from the graph shown in FIG. 5, the outputs LDPls become dense on the infinite side and sparse on the near side. As described below by the use of FIG. 6, the camera according to the present embodiment preserves the relationship based on this graph between the reciprocal of the distance (1/L) and LDPls in a table.

When the RF mode is set, the distance designated by the rotation operation of an MF ring (distance ring 51) is converted into the reciprocal of the distance (1/L) as explained by the use of FIG. 4. FIG. 5 shows the drive position (LDPls) of the focus lens 11b with respect to the converted reciprocal of the distance (1/L). Since the mutual relationship is preserved in a table, only discrete values are known. That is, the table stores only the relationship of LDPls with respect to the reciprocal of the discrete distance (1/L).

Accordingly, the output LDPls (Qy in FIG. 5) is calculated for an input value Px of the reciprocal of the distance (1/L) by linear interpolation calculation using respective four LDPls (Q1 to Q4 in FIG. 5) for the four reciprocals of the distances P1 to P4 before and after the input value Px. Note that, while the linear interpolation calculation is performed by the use of four points before and after the input value Px in the present embodiment, the present invention is not limited to this case, and the output LDPls may be calculated by another type of interpolation calculation.

Figure 6:
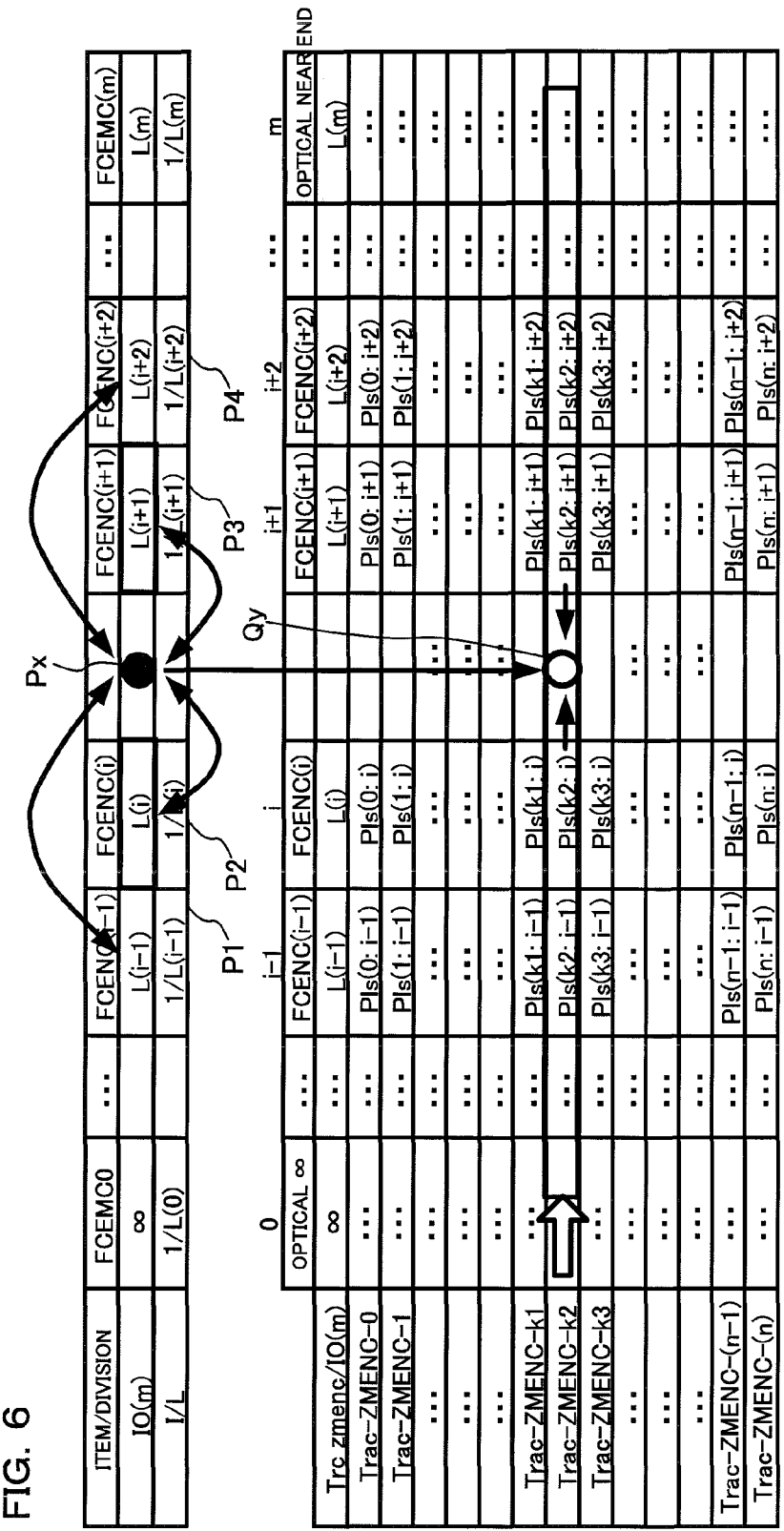
FIG. 6 is a diagram showing a table for the calculation of a focus lens position (LDPls) depending on a focal length from the reciprocal of a subject distance (1/L) in a camera according to an embodiment of the present invention.

While FIG. 5 shows a concept for a calculation method of the focus lens position (output LDPls) corresponding to the input value (reciprocal of the distance) at some focal length, actually the focus lens position (output LDPls) is obtained by the use of a table as shown in FIG. 6.

FIG. 6 shows the relationship shown in FIG. 5 between the reciprocal of the distance (1/L) and LDPls in a table. While the focal length of the interchangeable lens is fixed in FIG. 5, FIG. 6 assumes that a zoom lens is used, and shows LDPls for each focal length and also the interpolation calculation on the table. The upper part of FIG. 6 shows the reciprocal of the distance (1/L) shown on the horizontal axis of FIG. 5 and the distance itself. In the drawing, Px corresponds to the input value Px in FIG. 5.

The lower part of FIG. 6 shows the focal length in the column in the vertical direction (Trac-ZMENC-0 to Trac-ZMENC-n) and shows LDPls corresponding to the respective reciprocals of the distances in each row. For example, when the focal length is Trac-ZMENC-k2, LDPls is Pls(k2: i) at a distance L(i), and LDPls is Pls(k2: i+1) at a distance L(i+1). Further, the lower part of FIG. 6 includes LDPls corresponding to each of the optical infinity and the optical near end which change optically according to the focal length (Trac-ZMENC-0 to Trac-ZMENC-n).

In the example of the interpolation calculation shown in FIG. 6, the focal length currently set by the zoom ring 52 is Trac-ZMENC-k2. In this example, the output LDPls (Qy) corresponding to the input value Px is obtained by the use of Pls(k2: i−1), Pls(k2: i), Pls(k2: i+1), and Pls(k2: i+2) which are LDPls corresponding to FCENC (i−1) to FCENC (i+2) (data sets corresponding to the distances L(i−1), L(i), L(i+1), and L(i+2).

Accordingly, the present embodiment calculates LDPls corresponding to the input data of the reciprocal of the distance (1/L) in the following sequence.

(1) FCENC region including input data of the reciprocal of the distance (1/L) is specified, and FCENC regions neighboring both sides thereof and representative 1/L data sets are obtained.

(2) LDPls corresponding to the FCENC regions neighboring both sides in above (1) are obtained from the current zoom position and the Trac-ZMENC table.

(3) LDPls corresponding to the input 1/L data is obtained by the linear interpolation equation using the data sets of above (1) and (2).

Figure 7:
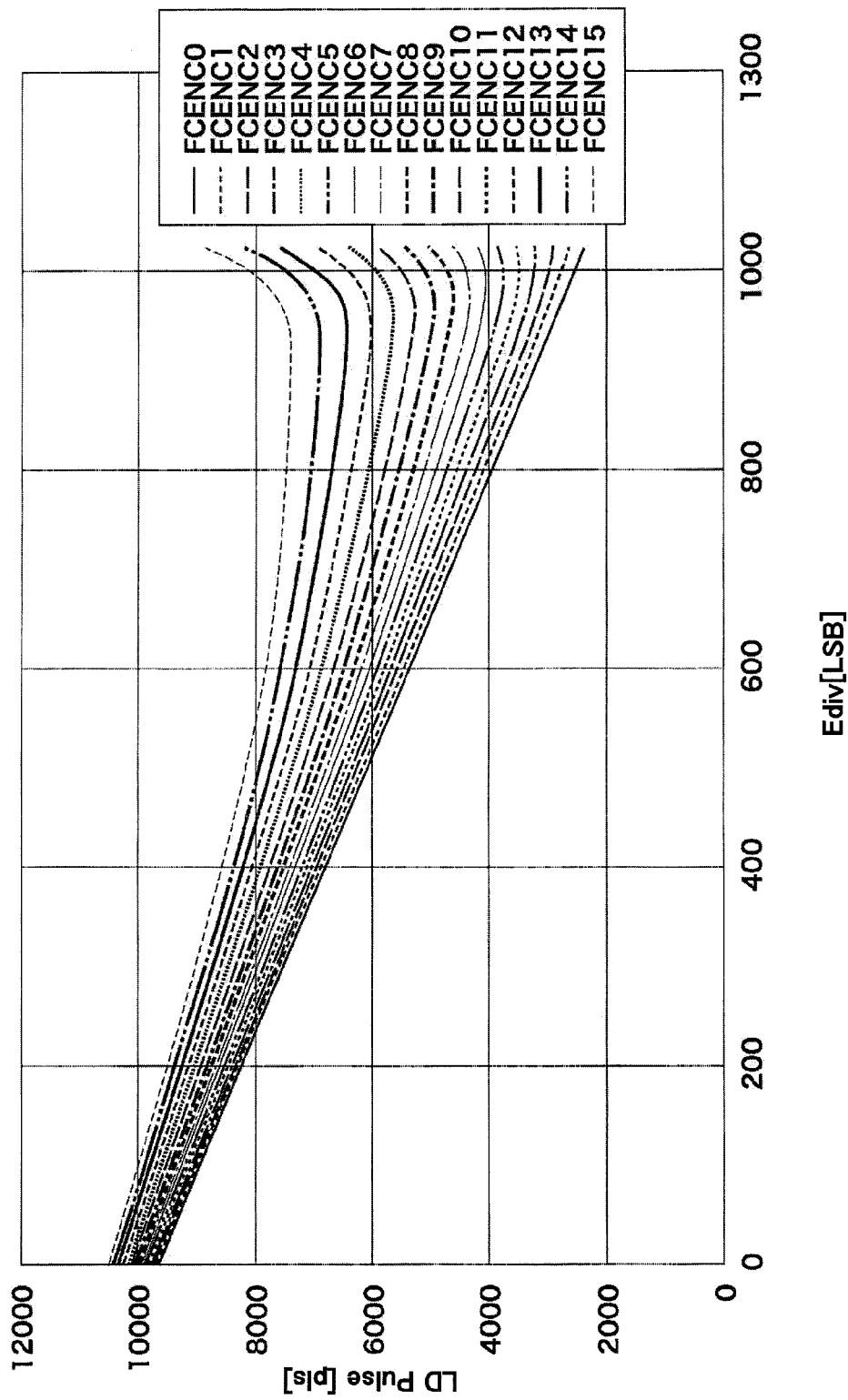
FIG. 7 is a graph showing a relationship between a focal length and a focus lens position (LDPls) for each subject distance, in a camera according to an embodiment of the present invention.

FIG. 7 shows an example of a trace for each of the subject distances (FCENC) when the horizontal axis shows the zoom position (focal length) and the vertical axis shows LDPls. That is, FIG. 7 shows the change of LDPls for each of the focal lengths at the same subject distance, and is a graph corresponding to FIG. 6. In the example shown in FIG. 7, when the zoom position (input value) is 800 Ediv and the subject distance is FCENC7, LDPls is approximately 5000. Here, in the present embodiment, the zoom position is detected by the linear encoder ZM position detection unit 82 divided into 1024 divisions, and displayed in units of Ediv. Further, LDPls corresponding to FCENC0 (optical infinity) and FCENC15 (optical near end) change as shown in FIG. 7, for example, according to the respective zoom positions (focal length).

In this manner, in the present embodiment, the RF mode is set, the distance ring 51 is operated rotationally by the user, and the subject distance is designated, and then this designated distance is detected by the linear encoder RF position detection unit 81 and the reciprocal of this distance (1/L) is obtained (refer to FIG. 4). Further, the focal length set by the zoom ring 52 at this time is detected by the linear encoder ZM position detection unit 82. The focus lens position LDPls is obtained by the use of the obtained reciprocal of the distance (1/L) and the set focal length (refer to FIG. 5 and FIG. 6). By the drive of the LDMT 73, which is the LD motor within the focus lens drive mechanism 25, focusing is performed at the subject distance designated by the user, according to a difference between the current focus lens position LDPls and the obtained focus lens position LDPls.

Next, state transition of the RF operation in the camera according to the present embodiment will be explained by the use of FIG. 8. As described above, the RF mode and the non-RF mode are switched by the slide of the distance ring 51 in the optical axis direction (arrows A and B in FIG. 8).

The RF mode has two states of "drive" to perform focusing at a distance designated by the user and "stop" to stop this drive operation. The change from the stop state to the drive state is performed when an AD change exceeds a hysteresis (arrow C in FIG. 8). Further, the change from the drive state to the stop state completes the drive when the AD change does not exceed the hysteresis (arrow D in FIG. 8). That is, when the distance ring 51 is operated to rotate in the RF mode, if the output of the A/D converter 43 which AD-converts the output from the linear encoder RF position detection unit 81 exceeds a certain constant amount (hysteresis), the stop state changes to the drive state, and if the output of the A/D converter 43 does not exceed the constant amount, the drive state changes to the stop state. This is performed for the purpose of preventing RF drive from starting or stopping against user's intention caused by chattering, noise output, or the like from the linear encoder RF position detection unit 81.

Figure 8:
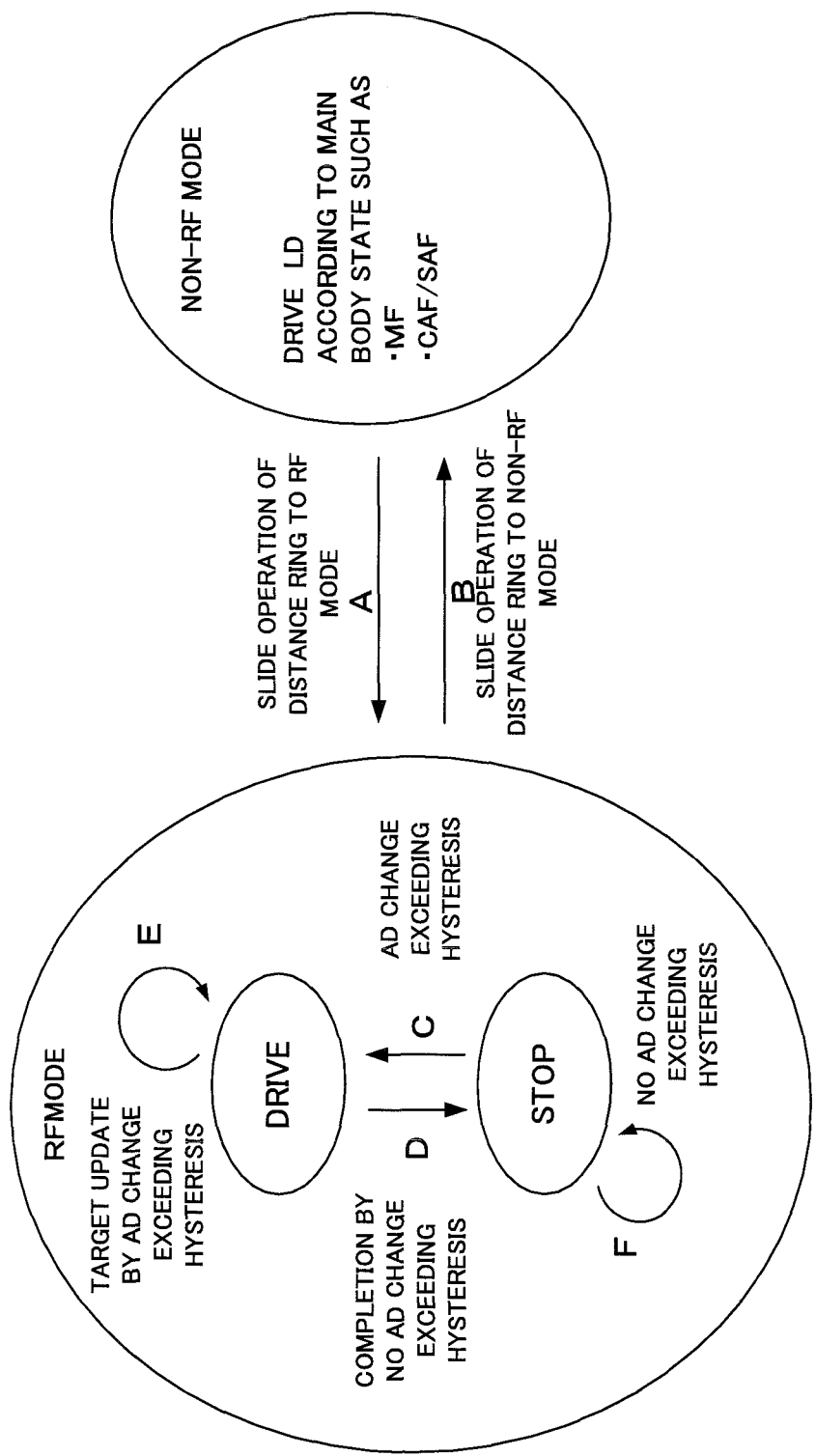
FIG. 8 is a state transition diagram in a camera according to an embodiment of the present invention.

Further, similarly, when the AD change exceeds the hysteresis, a drive target is updated and the drive state is continued (arrow E in FIG. 8), and, when the AD change does not exceed the hysteresis, the stop state is continued (arrow F in FIG. 8). Note that, in the RF setting, the drive in response to an instruction from the camera main body such as an instruction of continuous AF (CAF), single AF (SAF), or the like as performed in the non-RF mode setting is not performed, but the drive is performed according to the operation from the distance ring 51.

In the non-RF mode setting, the focus lens drive (LD drive) is performed according to the state of the camera main body such as the manual focus (MF), CAF, and SAF. Here, in the manual focus (MF), the focus lens 11b is driven according to the rotation direction and the rotation amount of the distance ring 51 as described above. Further, in the setting of OAF or SAF, the focusing state is detected in the camera main body, a focus lens drive control signal is input from the camera main body according to this detected focusing state, and the control unit 41 performs the drive control of the focus lens 11b according to this drive control signal.

Next, the operation of the RF mode in the present embodiment will be explained by the use of the flowcharts shown in FIG. 9 to FIG. 16. These flowcharts are executed by the control unit 41 within the interchangeable lens 100 controlling each unit within the interchangeable lens 100.

Figure 9:
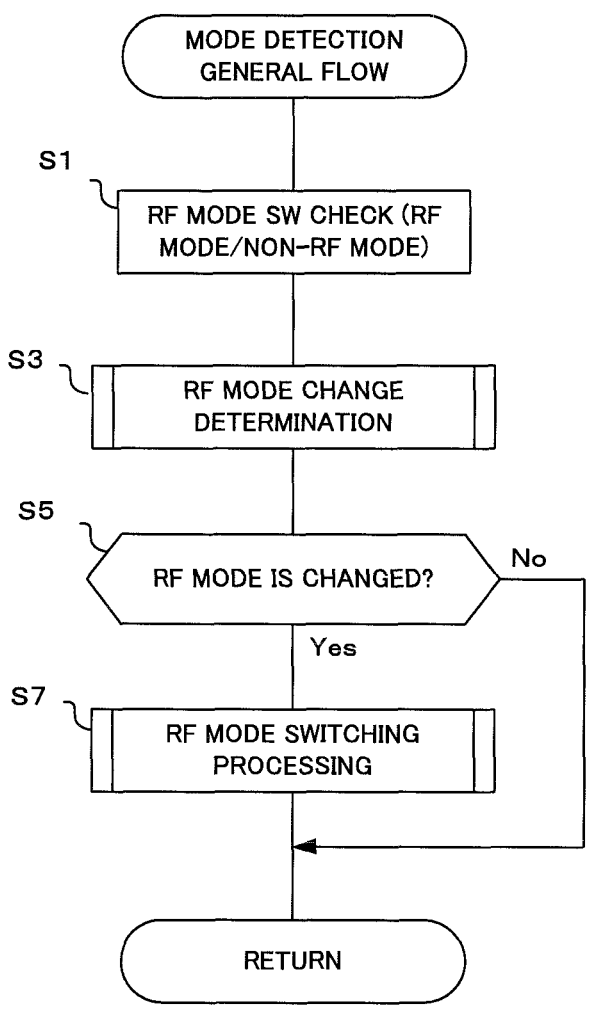
FIG. 9 is a flowchart showing the operation of mode switching in a camera according to an embodiment of the present invention.

The general flow of the mode detection shown in FIG. 9 is performed at each predetermined time and the mode switching is detected. Entering the mode detection general flow, first the RF mode switch is checked and it is determined whether or not either the RF mode or the non-RF mode is set (S1). Here, the operation state of the RF/MF mode detection SW 83 (refer to FIG. 2) is input and the determination is performed according to this operation state.

After the check of the RF mode SW, next RF mode change determination is performed (S3). Here, sometimes the RF/MF mode SW changes because of the chattering. Accordingly, the RF mode change is determined in this step by determination whether the results of the mode detection are the same or not in the prescribed number of times (during a prescribed time) as the result of the RF mode SW check in step S1.

After the RF mode change determination in step S3, it is determined according to this determination whether RF mode is changed or not (S5). When the RF mode is changed as this determination result, RF mode switching processing is performed (S7). Here, the mode is set to the RF mode or non-RF mode which is set by the user. The detailed operation of this RF mode switching processing will be described below by the use of FIG. 10. On the other hand, when the RF mode is not changed as the determination result, or after the RF mode switching processing in step S7 is performed, the mode detection flow is finished and the process returns to mode detection periodic monitor processing.

Figure 10:
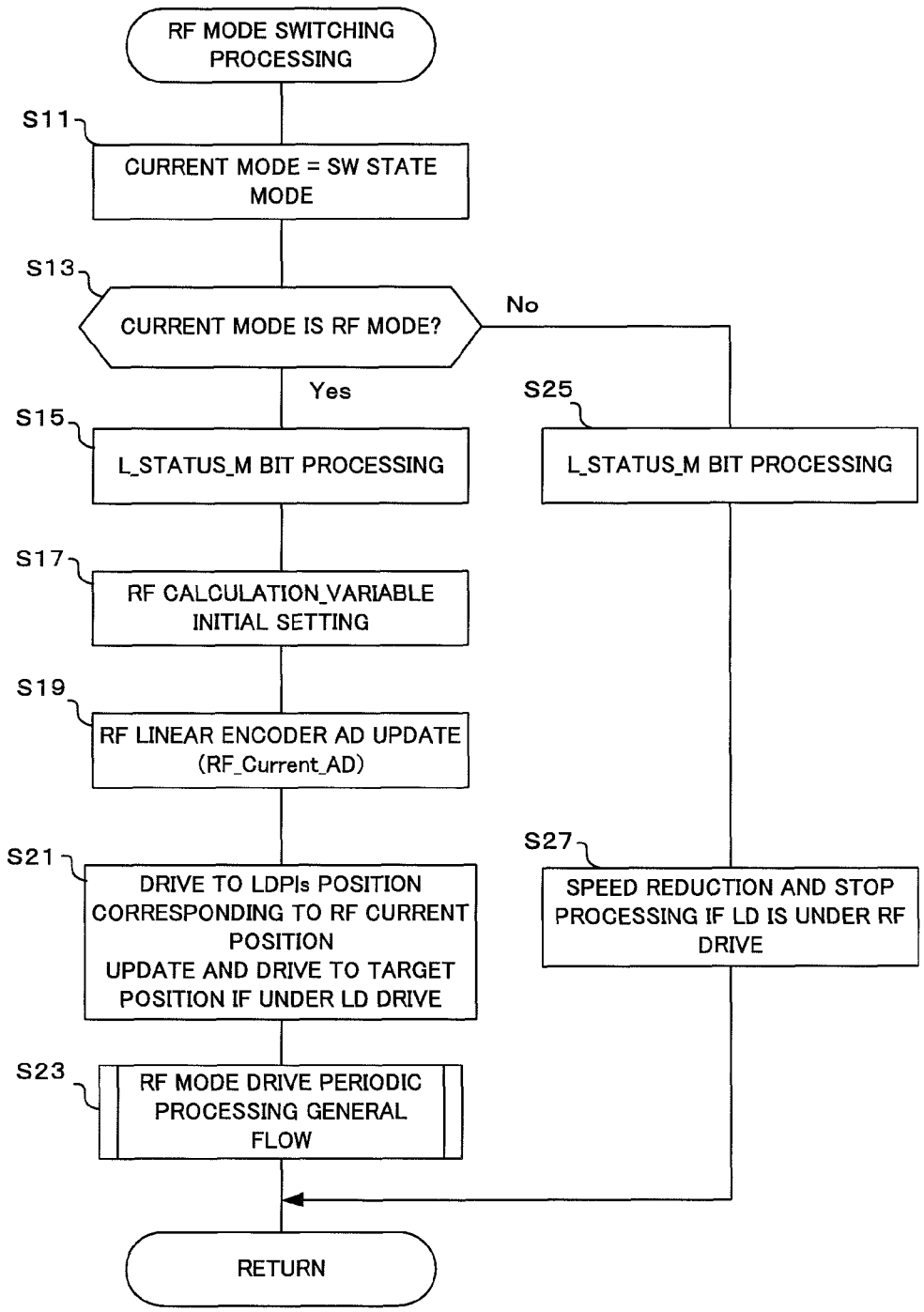
FIG. 10 is a flowchart showing the operation of RF mode switching processing in a camera according to an embodiment of the present invention.

Next, the operation of the RF mode switching processing in step S7 will be explained by the use of FIG. 10. This RF mode switching processing includes an operation as a mode switching processing unit to update an RF mode before the update (RF_Mode_Prev) to a current mode (RF_Mode_Current) in steps S11, S13, S15, and S25 and an operation as a mode switching RF drive unit to perform the RF drive in the mode switching in steps S17 to S21, and S27.

Entering the RF mode switching processing flow, first the current mode is set to a mode of the SW state (S11). Here, the mode set in step S7 according to the setting state of the RF/MF mode detection SW 83 is set to the current mode.

After the current mode is set in step S11, next it is determined whether the current mode is the RF mode or not (S13). When the current mode is the RF mode as this determination result, L_STATUS_M bit processing is performed according to the result (S15). The L_STATUS_M bit processing is processing of setting various kinds of flag indicating the state of the interchangeable lens 100 (RF_Mode_Flag, AF prohibit state bit, AF/MF state bit, and the like to be shown in the following). These various kinds of flag are transmitted to the camera main body 200 for notification about the state of the interchangeable lens 100. Here, the processing is performed for a case when the current mode is switched to the RF mode (RF_Mode_Prev: 1). In this case, RF_Mode_Flag is set to one. Further, the lens AF prohibit state bit in lens state transmission data (L_STATUS_M) is set to one, and the AF/MF state bit is set to one.

On the other hand, when the current mode is not the RF mode as the determination result in step S13, the L_STATUS_M bit processing is performed according to this result (S25). Here, the processing is performed for a case where the current mode is switched to the non-RF mode (RF_Mode_Prev: 0). In this case, the RF_Mode_Flag is cleared to zero. Further, the lens AF prohibit state bit in the lens state transmission data (L_STATUS_M) is cleared to zero, and the AF/MF state bit is cleared to zero.

After the processing in step S15, the RF drive in the mode switching is performed in steps S17 to S21. First, an RF calculation_variable initial value is set (S17). Here, an initial value of a variable to be used in the RF mode drive is set.

Subsequently, RF linear encoder AD (RF_Current_AD) is updated (S19). The output of the linear encoder RF position detection unit 81 is A/D converted by the A/D converter 43, and the AD conversion value is updated.

Subsequently, target position Pls calculation is performed, an LDPls position corresponding to the current position of the RF ring (distance ring) 51 is calculated, the focus lens 11b is driven to this LDPls position, and the drive is performed after the update of a target position if the focus lens 11b is being driven (during LD drive) (S21). Since the calculation of the target position Pls uses RF_Prev_AD, RF_Current_AD is substituted for RF_Prev_AD. When the drive direction is the infinite direction compared with the current LDPls position as the result of the target position Pls calculation, a flag RE_Drv_dir indicating the drive direction is set to zero, and, when the drive direction is the near end direction, RF_Drv_dir is set to one. LDPls as the result of the target position Pls calculation is used as target LDPls, and the absolute value drive is performed by the LD motor (LDMT 73). Details of the target position Pls calculation will be described below.

After the processing in step S21, next an RF mode drive periodic processing general flow is executed (S23). Here, the AD value according to the movement of the RF ring (distance ring) 51 detected by the linear encoder RF position detection unit 81 and the A/D converter 43 is monitored periodically, and the RF drive is performed according to the change of this AD value. The detailed operation of this RF mode drive periodic processing will be described below by the use of FIG. 11.

After the processing in step S25, the RF drive in the mode switching is performed. That is, if the focus lens 11b is being driven (during the RF drive in LD), stop processing is performed after the reduction of the speed thereof (S27). Step S27 is executed when the RF mode is switched to the non-RF mode, and, if the RF drive is performed as the lens drive (LD), the stop processing is performed after the speed reduction.

After the RF mode drive periodic processing in step S23, or after the stop processing in step S27, the RF mode switching processing flow is finished and the process returns to the original flow.

In the RF mode switching processing of FIG. 10, the target position Pls calculation is performed in step S21, and details will be explained in the following. In this target position Pls calculation, LDPls is calculated using the AD conversion value of the detection result in the linear encoder RF position detection unit 81. This target position Pls calculation is performed in the following sequence.

(1) 1/L subject distance data is calculated from RF_Prev_AD by the use of the AD conversion value-1/L linear interpolation equation corresponding to the relationship shown in FIG. 4.

(2) An FCENC region which is a focus region corresponding to above 1/L is obtained (FIG. 6).

(3) LDPls is obtained from the focus tracking table including the focus region FCENC and the zoom position Trac_ZMENC (refer to FIG. 6). Target LDPls for the drive to the initial position in the RF mode switching is determined by the use of calculated LDPls.

Next, an encoder detection method of the RF drive will be explained. In the RF drive, there is a method of dividing the range of the AD value expressing the subject distance appropriately from the near end to the infinity, and determining the LDPls corresponding to each of these divided regions. That is, this is a method of converting the AD value into LDPls by the use of only higher order bit of the rounded AD value. In the present embodiment, however, for performing the RF drive to enable fine distance setting, the control is performed in units of the LSB of the AD value. However, when the control is performed in units of the LSB of the AD value, the resolution of the AD value is so high that the focus drive is performed against user's intention or the influence of error detection in the AD conversion becomes large. Accordingly, for avoiding these problems, the control is performed by the use of the hysteresis (insensitive region) provided for the AD value. In the RF drive, since the control is performed in units of the LSB, the control is performed in consideration of signal noise, chattering, and the like. An offset to be explained in the following and the hysteresis are prepared, and the hysteresis is changed depending on the operation, so as to obtain the most suitable operational feeling.

Specifically, in the present embodiment, RF_Offset_AD (offset AD) is prepared as an offset at the encoder end. Further, an activation judgment hysteresis RF_Launch_his_AD, an in-drive AD update judgment hysteresis RF_Drv_his_AD, and a user operation stop judgment hysteresis of the MF ring 51 RF_Stop_his_AD are prepared as the hysteresis. Further, the number of determinations and a direction flag are prepared as judgment criteria for suppressing the error detection such as one caused by the chattering. The AD value established satisfying these judgment criteria is converted into the subject distance by the use of the 1/L subject distance data, further the target LDPls position of the RF drive is calculated by the use of the focus tracking table and the information of zoom ring position (Trac-ZMENC), and the focus lens 11b is driven to the calculated target LDPls position.

Note that an MF ring operation state flag is prepared for flag processing in the RF drive, in addition to the above described flags. This flag expresses the operation state of the distance ring 51 (also called MF ring), and is set to "1" when the distance ring 51 is operated, and is set to "0" when it is not operated. This MF ring operation state flag is output from the interchangeable lens 100 to the camera main body 200 by lens communication, and the camera main body 200 may use this flag for determination of enlarged display or the like in the MF ring operation.

Next, the RF mode drive periodic processing in step S23 (FIG. 10) will be explained by the use of FIG. 11. This flow executes periodic monitoring at each time interval Tim_RF_AD_Detec to monitor the AD value of the output from the linear encoder RF position detection unit 81. Further, the flow updates the AD value of the output from the linear encoder RF position detection unit 81 (updated AD value is RF_Current_AD). It is judged depending on respective conditions of the stop state and the drive state whether the updated AD value is reflected or not to the preserved variable (RF_Prev_AD). Whether RF drive is being performed or not is confirmed by RF_Drv_Flag, and RF drive is being performed in the case of "1" and the RF drive is stopped (non-drive) in the case of "0".

Figure 11:
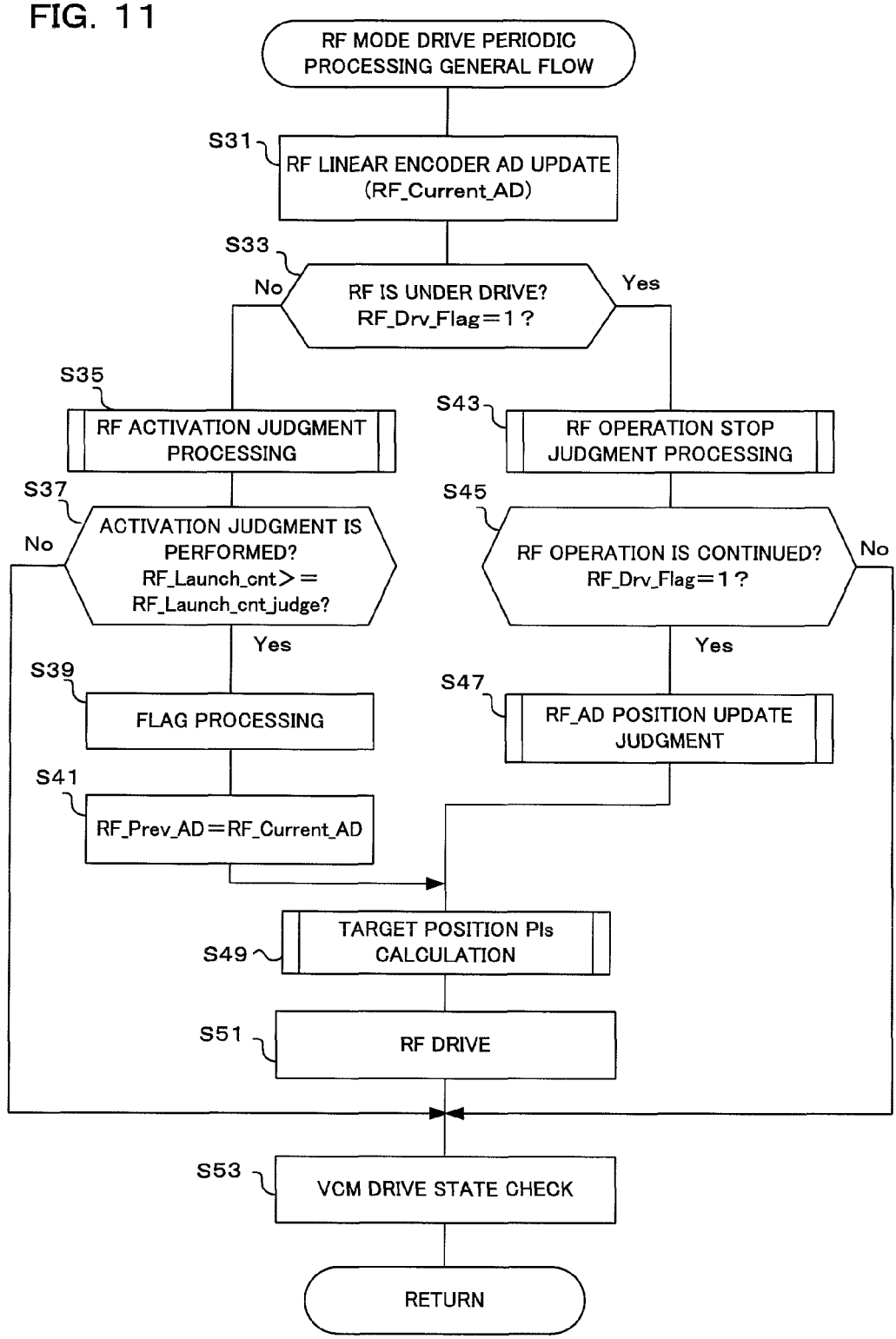
FIG. 11 is a flowchart showing the operation of RF mode drive periodic processing in a camera according to an embodiment of the present invention.

Entering the RF mode drive periodic processing shown in FIG. 11, first the RF linear encoder AD is updated (S31). Here, the AD value of the output from the linear encoder RF position detection unit 81 is obtained, and this obtained AD value is set to RF_Current_AD.

After the RF linear encoder AD is updated in step S31, next it is determined whether RF drive is being performed or not (S33). This determination determines that RF drive is being performed when RF_Drv_Flag to indicate whether RF drive is being performed or not exhibits "1", and determines that RF drive is stopped (non-drive) when this flag exhibits "0".

When the flag exhibits "0", that is, RF drive is stopped (non-drive) as the determination result in step S33, the RF activation judgment processing is performed (S35). This RF activation judgment processing performs activation judgment whether or not the distance ring 51 exists near a mechanical end (infinite end or nearest end of a mechanical endpoint) and whether the distance ring 51 is operated by the user. The detailed operation of this RF activation judgment processing will be described below by the use of FIG. 12.

After the RF activation judgment processing in step S35, next it is determined whether RF mode is activated or not (S37). Here, it is determined whether or not the number of activation judgment times RF_Launch_cnt is not smaller than the number of activation judgment determination times RF_Launch_cnt_judge.

When the number of activation judgment times RF_Launch_cnt is smaller than the number of activation judgment determination times RF_Launch_cnt_judge as the determination result in step S37 (No, as the determination result), the process proceeds to step S53, checks a VCM drive state and waits for the next periodic monitoring.

On the other hand, when the number of activation judgment times RF_Launch_cnt is not smaller than the number of activation judgment determination times RF_Launch_cut_judge as the determination result in step S37 (Yes, as the determination result), it is judged that RF mode is activated and flag processing is performed (S39). The flag processing after the activation processing in this step sets an MF ring operation state bit to "1" and sets RF_Drv_Flag to "1" to set the drive state. Further, the number of activation judgment times RF_Launch_cnt is cleared to "0".

After the flag processing in step S39, the updated AD value RF_Current_AD is substituted for RF_Prev_AD for preserving the updated RF linear encoder AD (S41).

When the flag exhibits "1", that is, the RF drive is being performed as the determination result in step S33, the RF operation stop judgment processing is performed (S43).

Here, it is determined whether or not the RF operation (rotation operation) of the distance ring 51 is performed by the user in the previous periodic monitor processing, and also the RF operation is continued also in the current periodic monitor processing. In this determination, it is judged whether the RF operation is continued or stopped according to the linear encoder AD value (RF_Current_AD) which is obtained in the current periodic monitor processing, and RF_Drv_Flag is set to "1" when the drive is continued, and cleared to "0" when the drive is stopped. The detailed operation of this RF operation stop judgment processing will be described below by the use of FIG. 13.

After the RF operation stop judgment processing in step S43, next it is determined whether the RF operation is continued or not (S45). Here, it is determined whether RF_Drv_Flag determined in step S43 exhibits "1" or not. When the RF operation is determined to be stopped as this determination result (No, as the determination result), the process proceeds to step S53, checks a VCM drive state and waits for the next periodic monitoring.

On the other hand, when the RF operation is judged to be continued as the determination result in step S45, RF_AD position update judgment is performed (S47). In the state here, the RF operation of the user is continued, and it is judged whether the position of the distance ring 51 is to be updated or not by the use of the AD value updated in the periodic monitoring in this state. The drive processing is performed using the AD value (RF_Current_AD) obtained in this RF_AD position update judgment as a new target position. The detailed operation of this RF_AD position update judgment will be described below by the use of FIG. 14.

After the update of the RF linear encoder AD value in step S41, or after the RF_AD position update judgment in step S47, next, target position Pls calculation is performed (S49). Here, the LD target Pls is calculated using the final AD value (RF_Prev_AD). The detailed operation of this target position Pls calculation will be described below by the use of FIG. 16.

After the target position Pls calculation in step S49, next the RF drive is executed (S51). Here, the focus lens 11b is driven to the new LD target Pls calculated in step S49.

Subsequently, the VCM drive state is checked (S53). Here, the control signal output from the camera main body 200 to the interchangeable lens 100 is checked. After the VCM drive state checking and processing accompanying the checking, the process returns to the original flow.

Next, the operation of the RF activation judgment processing in step S35 (FIG. 11) will be explained by the use of the flowchart shown in FIG. 12. In this flow, it is judged whether the RF drive is to be activated or not when the RF drive is not being performed.

Entering the RF activation judgment processing flow, steps S61 to S75 perform processing depending on whether the obtained AD value exists in an end+end offset range or not. Here, the "end" means a mechanical end point, and the mechanical end is an end part of a movement range from the infinity side to the near end side of the focus lens 11b and a limit of the mechanical movement of the focus lens 11b. Further, the end+end offset range means a range in which the end offset is taken into account for the mechanical end. End offset AD is an AD value corresponding to the end offset, and this end offset AD value is stored preliminarily in the storage unit 37 as RF_Offset_AD.

Entering the RF activation judgment processing flow, first it is determined whether or not obtained AD exists on the infinity side having a value not larger than end+end offset AD (S61). Here, it is determined whether or not the currently obtained AD value (RF_Current_AD) exists in an end offset AD range on the infinity side having a value not larger than a far-side adjustment AD value (Adj_AD_Far)+end offset AD (RF_Offset_AD). The infinity side adjustment AD value (Adj_AD_Far) is an adjustment value to determine the position of the optical infinity.

When the obtained AD value exists on the infinity side having a value not larger than end+end offset AD, that is, in the end offset AD range on the infinity side as the determination result in step S61, next it is determined whether or not the previously obtained AD value also exists on the infinity side having a value not larger than end+end offset AD (S63). Here, it is determined whether or not the previously obtained AD value (RF_Prev_AD) also exists in the end offset AD range on the infinity side.

When the previously obtained AD value also exists on the infinity side having a value not larger than end+edge offset AD as the determination result in step S63, RF_Drv_dir is set to the infinite direction (0) (S67). Here, an RF drive direction flag RF_Drv_dir is set to zero, and the RF drive direction is set to the infinite direction. The case that the process proceeds from steps S61 to S63 and then to S67 corresponds to the case that the distance ring 51 exists near the mechanical end on the infinity side, and the RF drive direction is set on the infinity side. After the processing in step S67, the RF activation judgment processing is finished and the process returns to the original flow.

On the other hand, when the previously obtained AD value does not exist on the infinity side having a value not larger than end+end offset AD as the determination result in step S63, an RF activation judgment count is counted up (S65). Here, the number of RF activation judgment times (RF_Launch_cnt) is counted up. That is, since the distance ring 51 does not exist near the mechanical end in the previous time but reaches near the mechanical end this time as the result of the RF drive, a counter to count the number of RF activation judgment times is counted up. After the processing in step S65, the RF activation judgment processing is finished and the process returns to the original flow.

When the obtained AD value does exist on the infinity side having a value not larger than end+end offset AD as the determination result in step S61, next it is determined whether or not the obtained AD value exists on the near end side having a value not smaller than end+end offset AD (S69). Here the sign of the end offset AD is reversed.

It is determined whether or not the currently obtained AD value (RF_Current_AD) exists in an end offset AD range on the near end side having a value not smaller than a near end side adjustment AD value (Adj_AD_Near)+end offset AD (RF_Offset_AD).

When the obtained AD value exists on the near end side having a value not smaller than end+end offset AD, that is, when exists in the end offset AD range on the near end side, as the determination result in step S69, next it is determined whether or not the previously obtained AD value also exists on the near end side having a value not smaller than end+end offset AD (S71). Here, it is determined whether or not the previously obtained AD value (RF_Prev_AD) also exists in the end offset AD range on the near end side.

When the previously obtained AD value also exists on the near end side having a value not smaller than end+end offset AD as the determination result in step S71, RF_Drv_dir is set to the near end direction (1) (S75). Here, the RF drive direction flag RF_Drv_dir is set to one, and the RF drive direction is set to the near end direction. The case that the process proceeds from steps S61 to S69, to S71, and then to S75 corresponds to the case that the distance ring 51 exists near the mechanical end on the near end side, and the RF drive direction is set on the near end side. After the processing in step S75, the RF activation judgment processing is finished and the process returns to the original flow.

On the other hand, when the previously obtained AD value does not exist on the near end side having a value not smaller than end+end offset AD as the determination result in step S71, the RF activation judgment count is counted up (S73). Here, the number of RF activation judgment times (RF_Launch_cnt) is counted up. That is, since the distance ring 51 does not exist near the mechanical end in the previous time but reaches near the mechanical end this time as the result of the RF drive, the counter to count the number of RF activation judgment times is counted up. After the processing in step S73, the RF activation judgment processing is finished and the process returns to the original flow.

As described above, in steps S61 to S75, the processing is performed for the case that the obtained AD value exists in the end+end offset range. When the AD value does not exist in the end+end offset range as the determination results in steps S61 and S69, the processing for the case that the AD value does not exist near the end but is larger than the activation judgment hysteresis is performed in steps S77 to S89.

When the obtained AD value does not exist on the near end side having a value not smaller than end+end offset AD as the determination result in step S69, next it is determined whether or not the obtained AD value (RF_Current_AD) exists on the infinite side than a position which is obtained by the subtraction of a hysteresis from the previous AD value (RF_Prev_AD) (S77). Here, it is determined whether or not the current position (RF_Current_AD) exists on the infinite side of a position which is obtained by the subtraction of the activation judgment hysteresis (RF_Launch_his_AD) stored preliminarily in the storage unit 37 as a hysteresis from the previous position (RF_Prev_AD). In the AD conversion of the output from the linear encoder RF position detection unit 81, sometimes the RF drive is performed by noise because a position is detected finely in units of the LSB. Accordingly, in the present embodiment, the activation judgment hysteresis (RF_Launch_his_AD) is stored in the storage unit 37 as an insensitive region, and the RF activation is performed when the movement in which a difference between the previous AD value and the current AD value is not smaller than the activation judgment hysteresis occurs in the predetermined number of times (RF_Launch_cnt_judge in S37 of FIG. 11) or more. Here, the AD value has a zero position on the infinite side, and the AD value increases towards the near end side.

When the obtained AD value exists on the infinite side of the previous AD value by an amount not smaller than the hysteresis as the determination result in step S77, RF_Drv_dir is set to the infinite direction (0) (S79). Here, the RF drive direction flag RF_Drv_dir is set to zero, and the RF drive direction is set to the infinite direction. The case that the process proceeds from steps S69 to S77 and then to S79 corresponds to the case that, while the distance ring 51 does not exist near the mechanical end on the infinite side, the user is operating the distance ring 51 from the stopped state toward the infinite direction, and therefore the RF drive direction is set to the infinite side.

When the obtained AD value does not exist on the infinite side of the previous AD value by an amount not smaller than the hysteresis as the determination result in step S77, next it is determined whether or not the obtained AD value (RF_Current_AD) exists on the near end side of a position which is obtained by the addition of the hysteresis to the previous AD value (RF_Prev_AD) (S81). Here, it is determined whether or not the current position (RF_Current_AD) exists on the near end side of the position obtained by the addition of the activation judgment hysteresis (RF_Launch_his_AD) to the previous position (RF_Prev_AD).

When the obtained AD value exists on the near end side of the position obtained by the addition of the hysteresis to the previous AD value as the determination result in step S81, FR_Drv_dir is set to the near end direction (1) (S83). Here, the RF drive direction flag RF_Drv_dir is set to one, and the RF drive direction is set to the near end direction. The case that the process proceeds from steps S69 to S81 and then to S83 corresponds to the case that, while the distance ring 51 does not exist near the mechanical end on the near end side, the user is operating the distance ring 51 from the stopped state toward the near end direction, and therefore RF drive direction is set to the near end side.

When the drive direction flag FR_Drv_dir is set to zero or one in step S79 or step S83, the RF activation judgment count is counted up (S85). Here, the number of RF activation judgment times (RF_Launch_cnt) is counted up. That is, since the the previous AD value does not exist near the mechanical end and further the movement in which the difference between the previous AD value and the current AD value is not smaller than the activation judgment hysteresis occurs, the counter to count the RF activation judgment time is counted up. After the processing in step S85, the RF activation judgment processing is finished and the process returns to the original flow.

When the obtained AD value does not exist on the near end side of the position obtained by the addition of the hysteresis to the previous AD value as the determination result in step S81, the RF_Prev_AD value is not updated (S87). Since the difference between the previous AD value and the current AD value exists within the hysteresis range as the determination result in step S81, the AD value obtained currently is not provided by user's operation. Therefore, the previous AD value (RF_Prev_AD) is not updated.

Subsequently, the RF activation judgment count is set to zero (S89). Since the AD value is not changed by the user's operation, the count of the RF activation judgment time (RF_Launch_cnt) is cleared. After the processing in step S89, the RF activation judgment processing is finished, and the process returns to the original flow.

Figure 12:
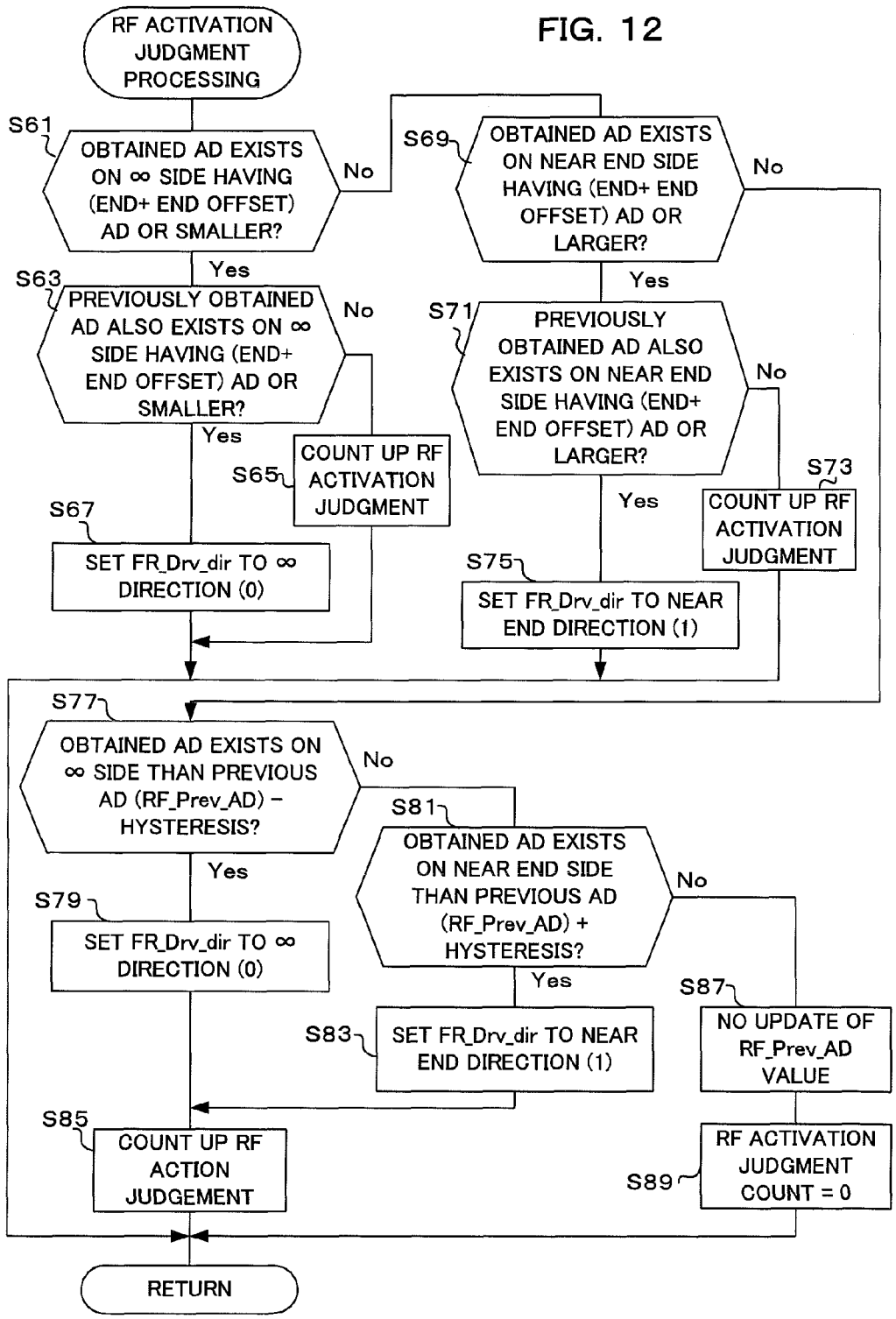
FIG. 12 is a flowchart showing the operation of RF activation judgment processing in a camera according to an embodiment of the present invention.

In this manner, the RF activation judgment processing shown in FIG. 12 performs the judgment whether or not the distance ring 51 exists near the mechanical end, and the activation judgment whether or not the user performed the operation near the mechanical end, using the currently obtained AD value (RF_Current_AD), the previously obtained AD value (RF_Prev_AD), and end offset AD (RF_Offset_AD) (S61 to S75). Further, the RF activation judgment processing performs the activation judgment whether or not the user operated the distance ring 51 by the operation in the state that the distance ring 51 did not exist near the mechanical end, using the currently obtained AD value (RF_Current_AD), the previously obtained AD value (RF_Prev_AD), and activation judgment hysteresis AD (RF_Launch_his_AD) (S77 to S89).

Next, the operation of the RF operation stop judgment processing in step S43 (FIG. 11) will be explained by the use of the flowchart shown in FIG. 13. In this flow, it is judged whether the RF drive is to be stopped or not in the state that the RF drive is being performed.

Entering the RF operation stop judgment processing flow, first it is determined whether or not the obtained AD value (RF_Current_AD) is smaller than a value obtained by the addition of the stop judgment hysteresis to the previous AD value (RF_Prev_AD) (S91). Here, it is determined whether or not the current position (RF_Current_AD) exists in a range of a position obtained by the addition of the stop judgment hysteresis (RF_Stop_his_AD) preliminarily stored in the storage unit 37 as the stop judgment hysteresis to the previous position (RF_Prev_AD). As described above, since, in the AD conversion of the output from the linear encoder RF position detection unit 81, a position is detected finely in units of the LSB, sometimes the AD value is erroneously detected by the noise or the chattering, and the RF drive is stopped. Accordingly, in the present embodiment, the stop judgment hysteresis (RF_Stop_his_AD) is stored in the storage unit 37 as an insensitive region, and the RF drive is stopped when the number of judgments that the difference between the previous AD value and the current AD value is smaller than the stop judgment hysteresis is not smaller than a predetermined number of times (RF_Stop_cnt_judge in S93 of FIG. 13).

When the obtained AD (in the following, the AD value is called AD) is larger than the previous AD+the stop judgment hysteresis as the determination result in step S91, the operation of the distance ring 51 is continued, and therefore the RF operation stop judgment flow is finished and the process returns to the original flow.

On the other hand, when the obtained AD is smaller than the previous AD+the stop judgment hysteresis as the determination result in step S91, it is determined whether or not the count of the stop judgment is not smaller than a prescribed count (S93). The number of judgments in step S91 that the obtained AD is smaller than the previous AD+the stop judgment hysteresis is counted by an RF stop judgment count (RF_Stop_cnt) (S95), and it is determined in step S93 whether or not this count value is not smaller than an RF operation stop judgment prescribed count (RF_Stop_cnt_judge). Note that the RF operation stop judgment prescribed count is preliminarily stored in the storage unit 37.

When the count of the stop judgment is smaller than the prescribed count as the determination result in step S93, the RF stop judgment count is counted up (S95). Here, when the RF operation stop count is smaller than the prescribed RF operation stop judgment count, the operation stop of the distance ring 51 is not judged to be performed and the RF operation stop count is counted up. After the count up, the RF operation stop judgment flow is finished and the process returns to the original flow.

On the other hand, when the count of the stop judgment is not smaller than the prescribed count as the determination result in step S93, flag processing is performed (S97). In this case, it is determined that the user's operation of the distance ring 51 is stopped, and then MF ring operation state bit is set to zero. After the flag operation, the RF operation stop judgment flow is finished and the process returns to the original flow.

Figure 13:
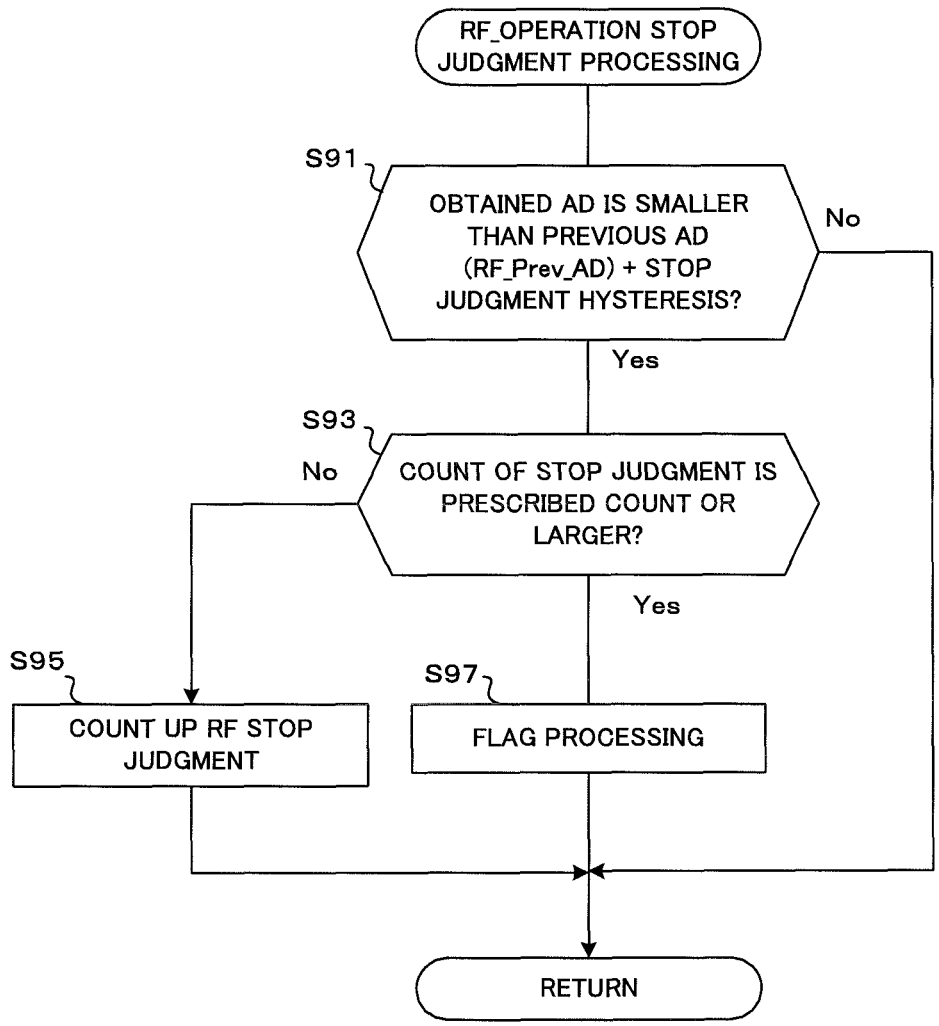
FIG. 13 is a flowchart showing the operation of RF operation stop judgment processing in a camera according to an embodiment of the present invention.

In this manner, in the RF operation stop judgment processing shown in FIG. 13, it is judged whether or not the RF operation (rotation operation of the distance ring 51 in the RF mode) was performed by the user in the previous periodic processing and the RF operation is continued also in the current periodic processing. It is judged whether or not the RF operation comes to the stop state from the previous state, depending on whether or not the absolute value difference between the previously obtained AD value (RF_Prev_AD) and the currently obtained AD value (RF_Current_AD) exists within the operation stop judgment hysteresis (RF_Stop_his_AD) (S91). Further, since, by only one time determination, there is a possibility of false determination caused by the chattering or the like, the final stop judgment is performed when the number of stop state determinations reaches a predetermined number of times (Yes in S93).

Next, the operation of the RF_AD position update judgment of step S47 (FIG. 11) will be explained by the use of the flowchart shown in FIG. 14 and FIG. 15. In this flow, it is determined whether or not the update is performed by the use of a newly obtained AD value when the RF drive is being performed. That is, since, while the AD value is changed by the user's operation of the distance ring 51, the distance designated by the user is detected in units of the LSB of the AD conversion, there is a problem in which the data might be updated with an false AD value caused by the AD conversion noise, the chattering in the detection unit, or the like. The flow of FIG. 14 prevents the update of the data with such a false AD value.

Entering the RF_AD position update judgment flow, it is determined whether or not the obtained AD is not larger than a value obtained by the subtraction of an AD update judgment hysteresis from the previous AD (RF_Prev_AD), and whether or not the obtained AD shows an operation of the distance ring in the infinite direction (S101). Here, it is determined whether or not the currently obtained AD value (RF_Current_AD) is not larger than a value obtained by the subtraction of an in-drive hysteresis AD value (RF_Drv_his_AD) which is the AD update judgment hysteresis from the previously obtained AD value (RF_Prev_AD) and also the distance ring 51 is being driven in the infinite direction.

When the obtained AD is not larger than the previous AD-AD update judgment hysteresis, or the distance ring 51 is being driven in the infinite direction as the determination result in step S101, next it is determined whether or not the previous drive direction is the infinite direction (S103). As described above, since a position is detected finely in units of the LSB in the AD conversion of the output from the linear encoder RF position detection unit 81, there is the case that the AD value is erroneously detected because of the AD converter noise or the chattering of the linear encoder. Accordingly, the present embodiment stores in-drive hysteresis AD (RF_Drv_his_AD) which is the AD update judgment hysteresis in the storage unit 37 as an insensitive region, and determines whether or not the difference between the previous AD value and the current AD value is smaller than the update judgment hysteresis.

When the previous drive direction is the infinite direction as the determination result in step S103, flag processing is performed (S107). Since the previous and current drive directions are the infinite direction in steps S101 and S103, a drive direction flag (RF_Drv_dir) is set to the infinite direction: 0.

After the flag processing in step S107, next the currently obtained AD value (RF_Current_AD) is set to RF_Prev_AD (S109). Since the currently obtained AD value is reliable from the judgment results of steps S101 and S103, the update of the AD value is performed.

When the previous drive direction is not the infinite direction as the determination result in step S103, next it is determined whether or not the count of the judgment that the drive direction is opposite to the previous direction is not smaller than a prescribed count (S105). The drive direction in step S101 is opposite to the drive direction in step S103. In this step, it is determined whether or not a drive direction count (RF_Drv_cnt) of the judgment that the drive direction is opposite to the previous direction is not smaller than drive direction count judgment (RF_Drv_cnt_judge) which is the prescribed count. Here, the drive direction count (RF_Drv_cnt) of the judgment that the drive direction is opposite to the previous drive direction is counted in step S115. Further, the drive direction count judgment (RF_Drv_cnt_judge) which is the prescribed count is preliminarily stored in the storage unit 37. Since, by only one time determination, there is a possibility that false determination is performed caused by the chattering or the like, the flag processing and the AD value update are performed when the count reaches the prescribed count.

When the count is smaller than the prescribed count as the determination result in step S105, the drive direction count of opposite (reversed) drive direction judgment (RF_Drv_cnt) is counted up (S115), and the RF_Prev_AD value is not updated (S117).

On the other hand, when the count is not smaller than the prescribed count as the determination result in step S105, flag processing is performed (S111). The drive direction flag (RF_Drv_dir) is judged to be set to the near end direction: 1 in step S103, and this direction is opposite to the direction of the obtained AD value. However, since the drive direction in step S101 is the infinite direction and also the drive direction count (RF_Drv_cnt) is not smaller than the drive direction count judgment (RF_Drv_cnt_judge), it is reliable that the drive is performed in the infinite direction, and the drive direction flag (RF_Drv_dir) is set to the infinite direction: 0. Further, the drive direction count (RF_Drv_cnt) is cleared to zero.

Subsequently, the obtained AD value is set to the RF_Prev_AD for update (S113). Since the drive direction count (RF_Drv_cnt) is not smaller than the drive direction count judgment (RF_Drv_cnt_judge) and the currently obtained AD value is reliable, the update of the AD value is performed.

After the processing in steps S109, S113, and S117, the RF_AD position update judgment flow is finished and the process returns to the original flow.

When the obtained AD value is not larger than the previous AD-AD update judgment hysteresis and also the drive direction is not the infinite direction as the determination result in step S101, next it is determined whether or not the obtained AD is not smaller than the previous AD (RF_Prev_AD)+the AD update judgment hysteresis and also the drive direction is the near end direction (S121). Here, it is determined whether or not the currently obtained AD value (RF_Current_AD) is not smaller than a value obtained by the addition of the in-drive hysteresis AD value (RF_Drv_his_AD) which is the AD update judgment hysteresis to the preciously obtained AD value (RF_Prev_AD) and also the distance ring 5 is being driven in the near end direction.

When the obtained AD value is not smaller than the previous AD+the AD update judgment hysteresis and also the drive direction is the near end direction as the determination result in step S121, next it is determined whether or not the previous drive direction is the near end direction (S123). As described above, sometimes the AD value is erroneously detected because of the A/D converter noise or the chattering of the linear encoder, and the in-drive hysteresis AD (RF_Drv_his_AD) which is the AD update judgment hysteresis is stored in the storage unit 37 as an insensitive region, and it is determined whether or not the difference between the previous AD value and the current AD value is smaller than the update judgment hysteresis.

When the previous drive direction is the near end direction as the determination result in step S123, flag processing is performed (S129). Since the previous and current drive directions are the near end direction in steps S121 and S123, the drive direction flag (RF_Drv_dir) is set to the near end direction: 1.

After the flag processing in step S129, next the currently obtained AD value (RF_Current_AD) is set to the RF_Prev_AD (S131). Since the currently obtained AD value is reliable from the judgment results in steps S121 and S123, the update of the AD value is performed.

When the previous drive direction is not the near end direction as the determination result in step S123, next it is determined whether or not the count of the judgment that the drive direction is opposite to the previous drive direction is not smaller than the prescribed count (S125). The drive direction in step S121 is opposite to that in step S123. In this step, it is determined whether or not the drive direction count (RF_Drv_cnt) of the judgment that the drive direction is opposite to the previous one is not smaller than the drive direction count judgment (RF_Drv_cnt_judge) which is the prescribed count.

When the count is smaller than the prescribed count as the determination result in step S125, the drive direction count of the opposite (reversed) drive direction judgment (RF_Drv_cnt) is counted up (S137) and the RF_Prev_AD value is not updated (S139).

On the other hand, when the count is not smaller than the prescribed count as the determination result in step S125, flag processing is performed (S133). In step S123, the drive direction flag (RF_Drv_dir) is judged to be set to the infinite direction: 0, and the drive direction is opposite to the direction of the obtained AD value. However, the drive direction currently obtained in step S121 is the near end direction, and also the drive direction count (RF_Drv_cnt) is not smaller than the drive direction count judgment (RF_Drv_cnt_judge) and it is reliable that the drive is performed in the near end direction, therefore the drive direction flag (RF_Drv_dir) is set to the near end direction: 1. Further, the drive direction count (RF_Drv_cnt) is cleared to zero.

Subsequently, the obtained AD value is set to the RF_Prev_AD for update (S135). Since the drive direction count (RF_Drv_cnt) is not smaller than the drive direction count judgment (RF_Drv_cnt_judge), and the currently obtained AD value is reliable, the update of the AD value is performed.

When the obtained AD is not larger than the previous AD+the AD update judgment hysteresis or also the drive direction is not the near end direction as the determination result in step S121, the FR_Prev_AD value is not updated (S127). Since the currently obtained AD value exists within the range of the in-drive hysteresis AD (RF_Drv_his_AD) according to the determination in steps S101 and S121, the reliability is low and the previous AD value (RF_Prev_AD) is not updated to the currently obtained AD value (RF_Current_AD).

After the processing in steps S127, S131, S135, and S139, the RF_AD position update judgment flow is finished and the process returns to the original flow.

Figure 14:
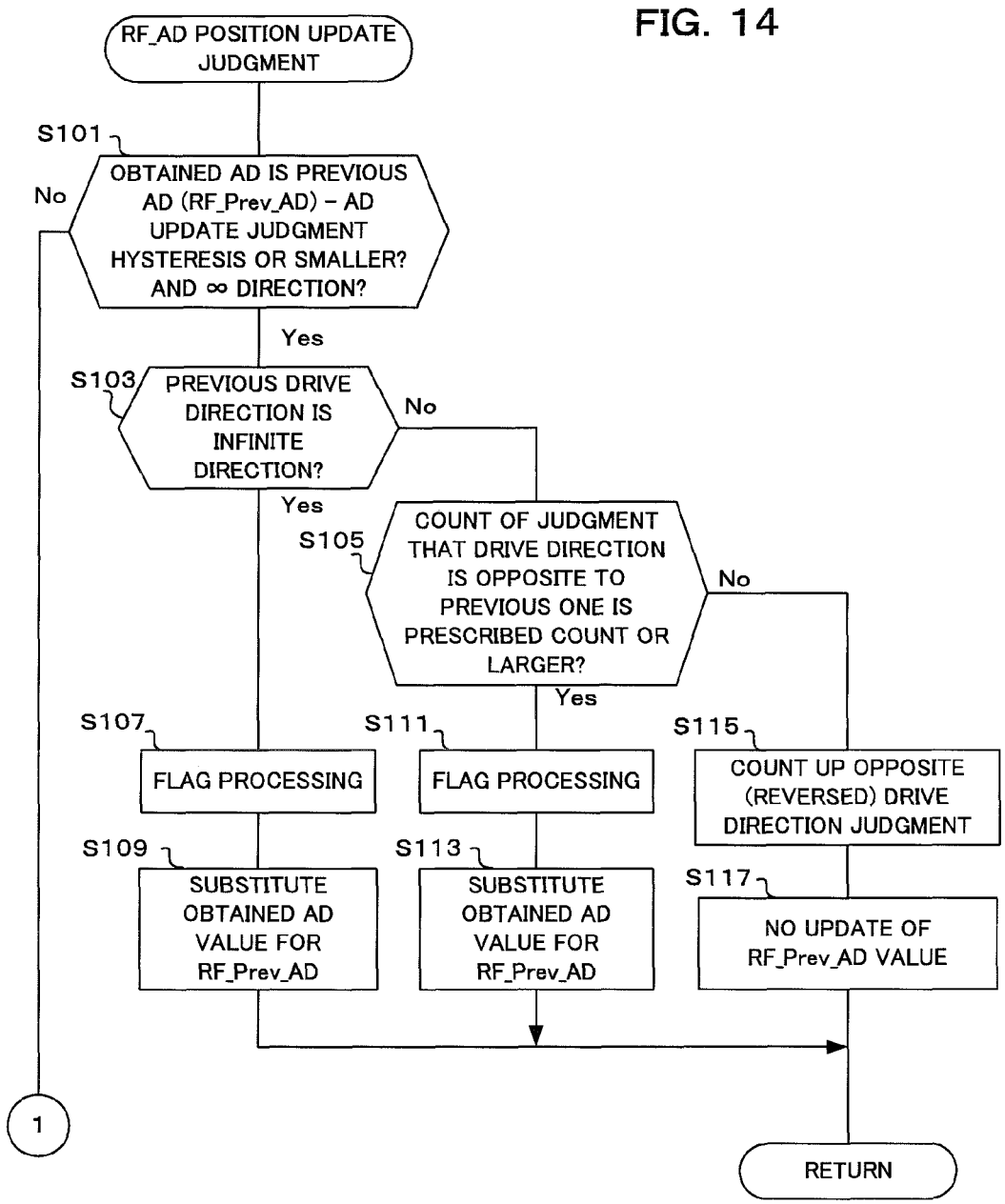
FIG. 14 is a flowchart showing the operation of RFAD position update judgment in a camera according to an embodiment of the present invention.
Figure 15:
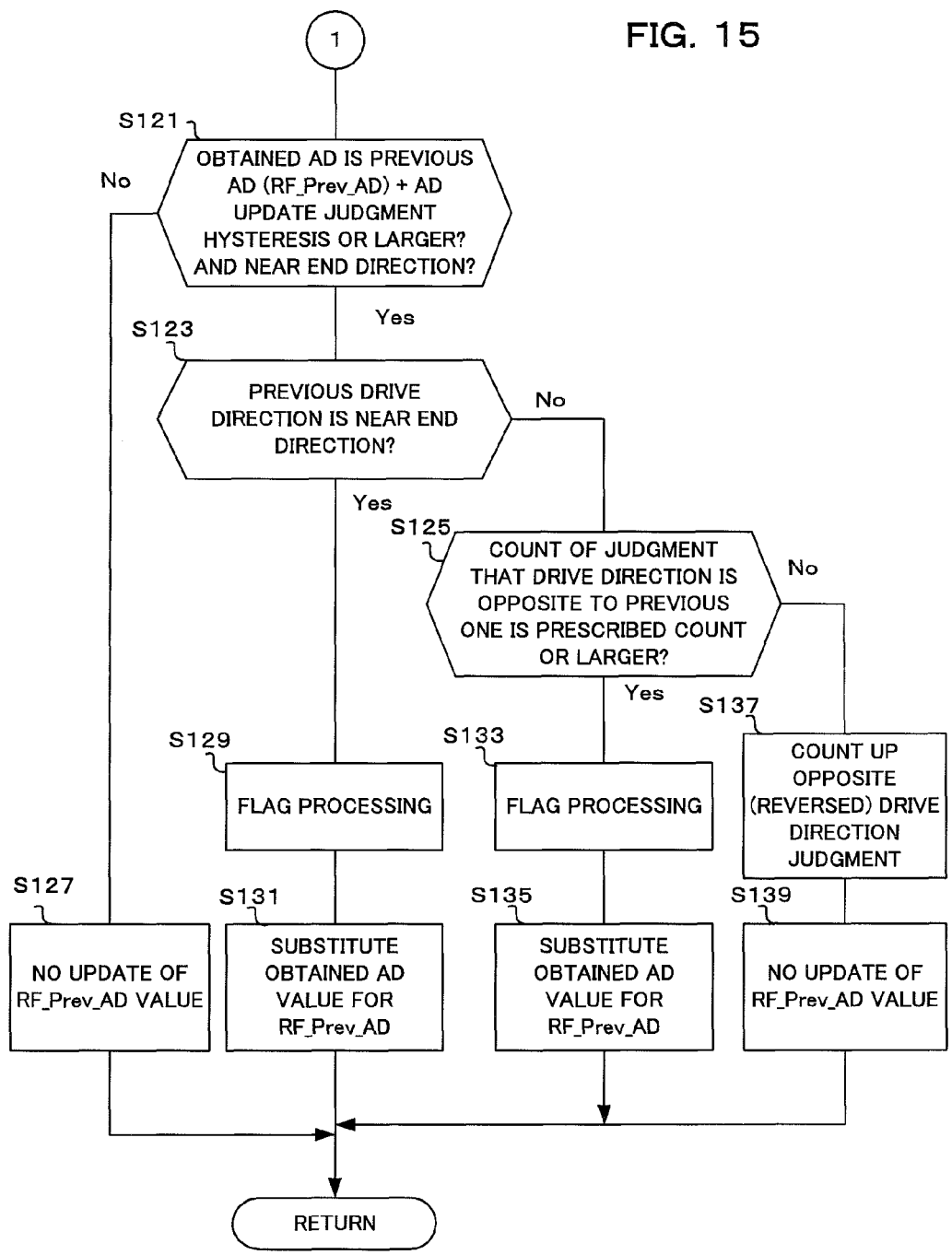
FIG. 15 is a flowchart showing the operation of RFAD position update judgment in a camera according to an embodiment of the present invention.

In this manner, in the RF_AD position update judgment shown in FIG. 14 and FIG. 15, it is judged whether the previously obtained AD value (RF_Prev_AD) is to be updated or not with the AD value (RF_Current_AD) obtained in the periodic monitoring while the user's operation of the distance ring 51 is continued. When the change of the currently obtained AD value is larger than the in-drive hysteresis AD (RF_Drv_his_AD), it is judged that the designated position is updated by the user's operation of the distance ring 51 (S101, S121). Further, in the case that the drive direction of the currently obtained AD value is opposite to the previous drive direction (No in S103 and No in S123), when the count value of the drive direction count (RF_Drv_cnt) is not smaller than the prescribed count (Yes in S105 and Yes in S125), it is judged that the distance ring 51 is operated by the user and the update of the AD value is performed. Thereby, drive direction reverse operation due to the chattering or the like is suppressed.

Figure 16:
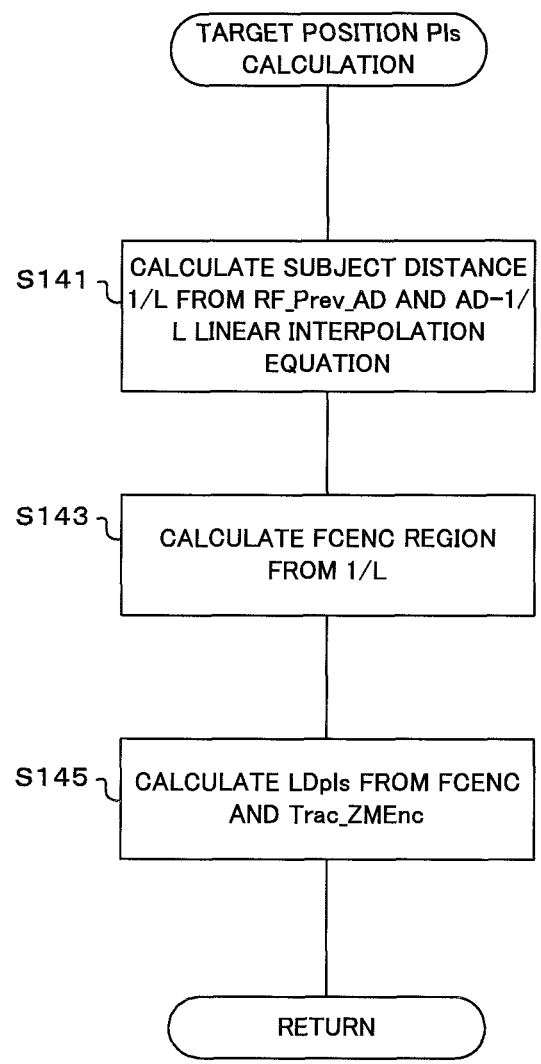
FIG. 16 is a flowchart showing the operation of target position Pls calculation in a camera according to an embodiment of the present invention.

Next, the operation of the target position Pls calculation in step S49 (FIG. 11) will be explained by the use of the flowchart shown in FIG. 16. As explained by the use of FIG. 4 to FIG. 6, roughly mentioned, when the distance (L) is designated by the user's operation of the distance ring 51, the target position Pls is obtained by the calculation of the reciprocal of this designated distance (1/L) and by the calculation of LDPls corresponding to the drive position of the focus lens 11b from this reciprocal of the distance (1/L).

Entering the target position Pls calculation flow, first the subject distance 1/L is calculated from the RF_Prev_AD and AD-1·L linear interpolation equation (S141). Here, the reciprocal of the distance 1/L is calculated by the AD-1/L linear interpolation equation by the use of the AD value (RF_Prev_AD) obtained by AD-converting the output of the linear encoder RF position detection unit 81 in the A/D converter 43.

After the calculation of the reciprocal of the distance (1/L), next an FCENC region is calculated from this 1/L (S143). The FCENC region shows a value corresponding to 1/L on the table as shown in FIG. 6.

After the calculation of the FCENC region, next LDPls is calculated from FCENC and Trac_ZMEnc (S145). Trac_ZMEnc is a value corresponding to the focal length on the table as shown in FIG. 6. When FCENC corresponding to 1/L and ZMEnc corresponding to the focal length are determined, Pls corresponding to the focusing position of the focus lens 11b can be obtained. Note that, since only a discrete value exists on the table, Pls may be obtained more accurately by the use of the interpolation equation. When the target position Pls of the focus lens is obtained, the drive amount of the focus lens 11b LDpls is determined as a difference between the target position Pls and the current position. After the calculation of LDpls, the target position Pls calculation flow is finished and the process returns to the original flow.

As described above, an embodiment of the present invention includes a focus adjustment lens (e.g., focus lens 11b) which is provided within a lens barrel containing a photographing lens and is movable in the optical axis direction, a ring member (e.g., distance ring 51) which is disposed rotatably with respect to the lens barrel in an angle range from a first end point to a second end point, a storage unit (e.g., storage unit 37) to store a first relationship between the rotation angle of the ring member and a distance (refer to FIG. 4, for example) and a second relationship between the position of the focus adjustment lens in the optical axis direction and the distance (refer to FIG. 5, for example), and a control unit (e.g., lens CPU 41) to calculate a distance corresponding to the rotation angle of the ring member according to the rotation angle of the ring member and the first relationship and to set the position of the focus adjustment lens in the optical axis direction according to this distance and the second relationship. Accordingly, it is possible to perform focusing at a distance designated by the operation member in the manual focusing. That is, since the distance is calculated from the rotation angle of the ring member and the position of the focus adjustment lens in the optical axis direction is calculated from this calculated distance, it becomes possible to perform the focusing at the designated distance.

Further, an embodiment of the present invention includes a zoom lens group within the lens barrel and a zoom position detection unit (e.g., zoom position detection unit 34) to detect zoom positions of the zoom lens group, and the storage unit stores a plurality of second relationships depending on the zoom positions (e.g., Trac_ZMENC in FIG. 6), and the control unit calculates a distance corresponding to the rotation angle of the ring member according to the rotation angle of the ring member and the first relationship, and sets the position of the focus adjustment lens in the optical axis direction according to this distance and the second relationships depending on the zoom positions. Further, one second relationship is selected depending on the zoom positions from the plurality of second relationships (for example, in FIG. 6, the focal lengths are Trac-ZMENC-x (x: 0 to n) and the second relationships are shown for a plurality of zoom positions) and the position of the focus adjustment lens in the optical axis direction is set according to the selected second relationship. Accordingly, it is possible to perform the focusing at a distance designated by the operation member even when the lens barrel is a zoom lens.

Further, an embodiment of the present invention obtains a plurality of positions of the focus adjustment lens in the optical axis direction according to the plurality of second relationships depending on the zoom positions, and calculates and sets the position of the focus adjustment lens in the optical axis direction by the interpolation method (for example, in FIG. 6, the position is calculated by the linear interpolation calculation by the use of four LDPls corresponding to the reciprocal values P1 to P4 of four distances before and after an input value Px). Accordingly, it is possible to accurately calculate the position of the focus adjustment lens in the optical axis direction even when the position is preserved as a discrete value.

Further, in an embodiment of the present invention, the first relationship associates the rotation angle of the ring member with the reciprocal of a distance (refer to FIG. 4, for example). Further, the second relationship associates the position of the focus adjustment lens in the optical axis direction with the reciprocal of the distance (refer to FIG. 5, for example). Accordingly, it becomes possible to use the LSB in the AD conversion of the output from the linear encoder for detecting the absolute position of the ring member, as a resolution without change.

Further, in an embodiment of the present invention, the control unit causes a position of the optical near end in the optical axis direction for the focus adjustment lens to correspond to a first end point of the ring member (e.g., end of S69 in FIG. 12), and causes a position of the optical infinity in the optical axis direction for the focus adjustment lens to correspond to a second end point (e.g., end of S61 in FIG. 12). Accordingly, it is possible to cause the optical near end and the optical infinity of the focus adjustment lens to correspond to end points (index) of the ring member on both sides. Note that, these first and second end points may be mechanical ends but may not be necessarily the mechanical ends.

Further, in an embodiment of the present invention, the control unit changes a position in the optical axis direction for the optical near end and a position in the optical axis direction for the optical infinity in the focus adjustment lens depending on the zoom positions. Accordingly, it is possible to obtain a focus tracking curve depending on zooming.

Note that, while the focus lens 11b is driven by a VCM (Voice Coil Motor) in an embodiment of the present invention, not limited to this case, another motor such as a typical stepping motor may be used. Further, while the position of the focus lens 11b is counted by the number of drive steps of the motor from a reference position, not limited to this case, the position may be detected directly by an encoder.

Further, while an embodiment of the present invention is explained by the use of a digital camera as an apparatus for photographing, the camera may be a digital single reflex camera, a compact digital camera, a motion picture camera such as a video camera and a movie camera, and further a camera built in a mobile phone, a smart phone, a Personal Digital Assistant (PDA), a game machine, or the like. In any case, the present invention can be applied if the apparatus is a photographing apparatus including an optical system capable of designating a distance by manual operation of an operation member.

Further, among the techniques explained in the present specification, the control mainly explained in the flowcharts frequently can be set by a program and sometimes stored in a recording medium or a recording unit. For a method of recording into the recording medium or the recording unit, the recording may be performed in product shipment, a distributed recording medium may be utilized, or download through the internet may be used.

Further, although the explanation is made by the use of words to express a sequence such as "first" and "next" for convenience, in claims, the specification, or the operation flow of the drawing, it does not mean that the execution in this order is essential, in a part not explained in particular.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to the above embodiment as it is, and can be embodied in an implementation phase by modifying the constituent in a range without departing from the gist thereof. Further, various inventions can be formed by an appropriate combination of a plurality of constituents disclosed in the above embodiments. For example, some constituents may be omitted from all the constituents disclosed in the embodiment. Moreover, the constituents across the various embodiments may be combined.

The invention claimed is:
1. A photographing apparatus comprising:
   a focus adjustment lens which is provided within a lens barrel containing a photographing lens and is movable in an optical axis direction;
   a ring member disposed rotatably with respect to the lens barrel in an angle range from a first end point to a second end point;
   a storage unit to store a first relationship between a rotation angle of the ring member and a value related to a subject distance, and a second relationship between a position of the focus adjustment lens in the optical axis direction and a value related to a subject distance to be focused corresponding to the position of the focus adjustment lens in the optical axis direction;

a rotation angle detection unit to detect a rotation angle of the ring member periodically; and a control unit to set a position of the focus adjustment lens in the optical axis direction according to the rotation angle of the ring member, wherein the control unit (1) judges that change of the rotation angle has started responsive to a determination that a number of times a difference between a previously obtained rotation angle and a subsequently obtained rotation angle exceeds a predetermined range exceeds a predetermined threshold, (2) calculates a value related to a subject distance corresponding to (i) the rotation angle of the ring member according to the rotation angle of the ring member, that is obtained when the determined number of times is determined to have exceeded a predetermined threshold, in accordance with judging that the change of the rotation angle has started and (ii) the first relationship, and (3) sets the position of the focus adjustment lens in the optical axis direction according to the value related to the subject distance and the second relationship.

2. The photographing apparatus according to claim 1, further comprising:

a zoom lens group provided within the lens barrel; and a zoom position detection unit to detect zoom positions of the lens group, wherein the storage unit stores a plurality of second relationships depending on the zoom positions, and the control unit calculates a value related to a subject distance corresponding to a rotation angle of the ring member according to the rotation angle of the ring member and the first relationship, and sets a position of the focus adjustment lens in the optical axis direction according to the value related to the subject distance and the second relationships depending on the zoom positions which are detected by the zoom position detection unit.

3. The photographing apparatus according to claim 2, wherein the control unit selects one second relationship from the plurality of second relationships depending on the zoom positions, and sets a position of the focus adjustment lens in the optical axis direction according to the selected second relationship.

4. The photographing apparatus according to claim 2, wherein the control unit obtains a plurality of positions of the focus adjustment lens in the optical axis direction according to the plurality of second relationships depending on the zoom positions, and calculates and sets a position of the focus adjustment lens in the optical axis direction by an interpolation method.

5. The photographing apparatus according to claim 1, wherein the value related to the subject distance in the first relationship is a reciprocal of a subject distance.

6. The photographing apparatus according to claim 5, wherein the value related to the subject distance in the second relationship is a reciprocal of a subject distance to be focused corresponding to a position of the focus adjustment lens in the optical axis direction.

7. The photographing apparatus according to claim 1, wherein the control unit causes a position of an optical near end in the optical axis direction for the focus adjustment lens to correspond to the first end point of the ring member, and causes a position of optical infinity in the optical axis direction for the focus adjustment lens to correspond to the second end point of the ring member.

8. The photographing apparatus according to claim 7, further comprising:

a zoom lens group within the lens barrel as a part of the photographing lens; and a zoom position detection unit to detect zoom positions of the zoom lens group, wherein the storage unit stores a plurality of second relationships depending on a focal length of the photographing lens, and the control unit changes the position of the optical near end in the optical axis direction and the position of the optical infinity in the optical axis direction for the focus adjustment lens, according to the zoom positions and the plurality of second relationships.

9. The photographing apparatus according to claim 8, wherein the control unit selects one second relationship from the plurality of second relationships depending on the zoom positions, and sets the position of the optical near end in the optical axis direction and the position of the optical infinity in the optical axis direction for the focus adjustment lens, according to the selected second relationship.

10. The photographing apparatus according to claim 7, wherein the control unit changes the position of the optical near end in the optical axis direction and the position of the optical infinity in the optical axis direction for the focus adjustment lens depending on the zoom positions.

11. The photographing apparatus according to claim 1, wherein the control unit judges that change of the rotation angle has stopped responsive to a determination that the number of times a difference between a previously obtained rotation angle and a subsequently obtained rotation angle is determined to be in a second predetermined range exceeds a second threshold; and stops setting the position of the focus adjustment lens in the optical axis direction according to the rotation angle, responsive to judging that the change of the rotation angle has stopped.

12. The photographing apparatus according to claim 1, wherein the control unit judges that the rotation angle has changed responsive to a determination that a difference between a previously obtained rotation angle and a subsequently obtained rotation angle exceeds a third predetermined range, and a previous rotation direction and a subsequent rotation direction are identical to each other, and sets the position of the focus adjustment lens in the optical axis direction according to the rotation angle converted from a rotation angle obtained when exceeding the third predetermined range, in accordance with judging that the rotation angle has changed.

13. An interchangeable lens control method of an interchangeable lens including a focus adjustment lens which is provided within a lens barrel containing a photographing lens and is movable in an optical axis direction, and a ring member disposed rotatably on the lens barrel in an angle range from a first end point to a second end point, and a rotation angle detection unit to detect a rotation angle of the ring member, the interchangeable lens control method comprising:

periodically detecting the rotation angle by the rotation angle detection unit;

judging that change of the rotation angle has started in a case where the number of times a difference between a previously obtained rotation angle and a subsequently obtained rotation angle is determined to have exceeded a predetermined range;
calculating a value related to a subject distance corresponding to a rotation angle of the ring member according to a first relationship between a rotation angle of the ring member and a value related to a subject distance, the rotation angle being obtained responsive to a determination that the determined number of times has exceeded a predetermined threshold, in accordance with judging that the change of the rotation angle has started; and
setting a position of the focus adjustment lens in the optical axis direction according to a second relationship between a position of the focus adjustment lens in the optical axis direction and a value related to a subject distance to be focused corresponding to the focus adjustment lens in the optical axis direction.

14. The interchangeable lens control method according to claim 13, wherein the interchangeable lens includes a zoom lens group as a part of the photographing lens within the lens barrel and a zoom position detection unit to detect zoom positions of the zoom lens group, the interchangeable lens control method further comprising:
calculating a value related to a subject distance corresponding to a rotation angle of the ring member according to the rotation angle of the ring member and the first relationship and
setting a position of the focus adjustment lens in the optical axis direction according to the value related to a subject distance and the second relationship depending on the zoom position which are detected by the zoom position detection unit.

15. The interchangeable lens control method according to claim 14, further comprising:
selecting one second relationship from the plurality of second relationships depending on the zoom positions; and
setting a position of the focus adjustment lens in the optical axis direction according to the selected second relationship.

16. The interchangeable lens control method according to claim 14, further comprising:
calculating a third relationship from the plurality of second relationships depending on the zoom positions, and setting a position of the focus adjustment lens in the optical axis direction according to the calculated third relationship.

17. The interchangeable lens control method according to claim 13, wherein
the value related to the subject distance in the first relationship is a reciprocal of a subject distance.

18. The interchangeable lens control method according to claim 17, wherein
the value related to the subject distance in the second relationship is a reciprocal of a subject distance to be focused corresponding to a position of the focus adjustment lens in the optical axis direction.

19. The interchangeable lens control method according to claim 13, further comprising:
causing a position of an optical near end in the optical axis direction for the focus adjustment lens to correspond to the first end point of the ring member; and
causing a position of an optical infinity in the optical axis direction for the focus adjustment lens to correspond to the second end point of the ring member.

20. The interchangeable lens control method according to claim 19, wherein
a zoom lens group as a part of the photographing lens and a zoom position detection unit to detect zoom positions of the zoom lens group are provided within the lens barrel, the interchangeable lens control method comprising changing the position of the optical near end in the optical axis direction and the position of the optical infinity in the optical axis direction for the focus adjustment lens, according to the zoom positions and a plurality of second relationships depending on a focal length of the photographing lens.

21. The interchangeable lens control method according to claim 20, further comprising:
selecting one second relationship from the plurality of second relationships depending on the zoom positions; and
setting the position of the optical near end in the optical axis direction and the position of the optical infinity in the optical axis direction for the focus adjustment lens, according to the selected second relationship.

22. The interchangeable lens control method according to claim 19, further comprising
changing the position of the optical near end in the optical axis direction and the position of the optical infinity in the optical axis direction for the focus adjustment lens, depending on the zoom positions.

23. The interchangeable lens control method according to claim 13, further comprising:
judging that the change of the rotation angle has stopped responsive to a determination that the number of times a difference between the previously obtained encoder signal and a subsequently obtained encoder signal is determined to be in a second predetermined range exceeds a second threshold; and
stopping setting the position of the focus adjustment lens in the optical axis direction according to the rotation angle, in accordance with judging that the change of the rotation angle has stopped.

24. The interchangeable lens control method according to claim 13, further comprising:
judging that the rotation angle has changed responsive to a determination that a difference between a previously obtained rotation angle and a subsequently obtained rotation angle exceeds a third predetermined range, and a previous rotation direction and a subsequent rotation direction are identical to each other, and
setting the position of the focus adjustment lens in the optical axis direction according to the rotation angle converted from an encoder signal obtained when exceeding the third predetermined range, in accordance with judging that the rotation angle has changed.

* * * * *